Feb. 27, 1934.  C. H. THORDARSON ET AL  1,948,776
MACHINE FOR WINDING COILS
Filed Feb. 24, 1930  17 Sheets-Sheet 2
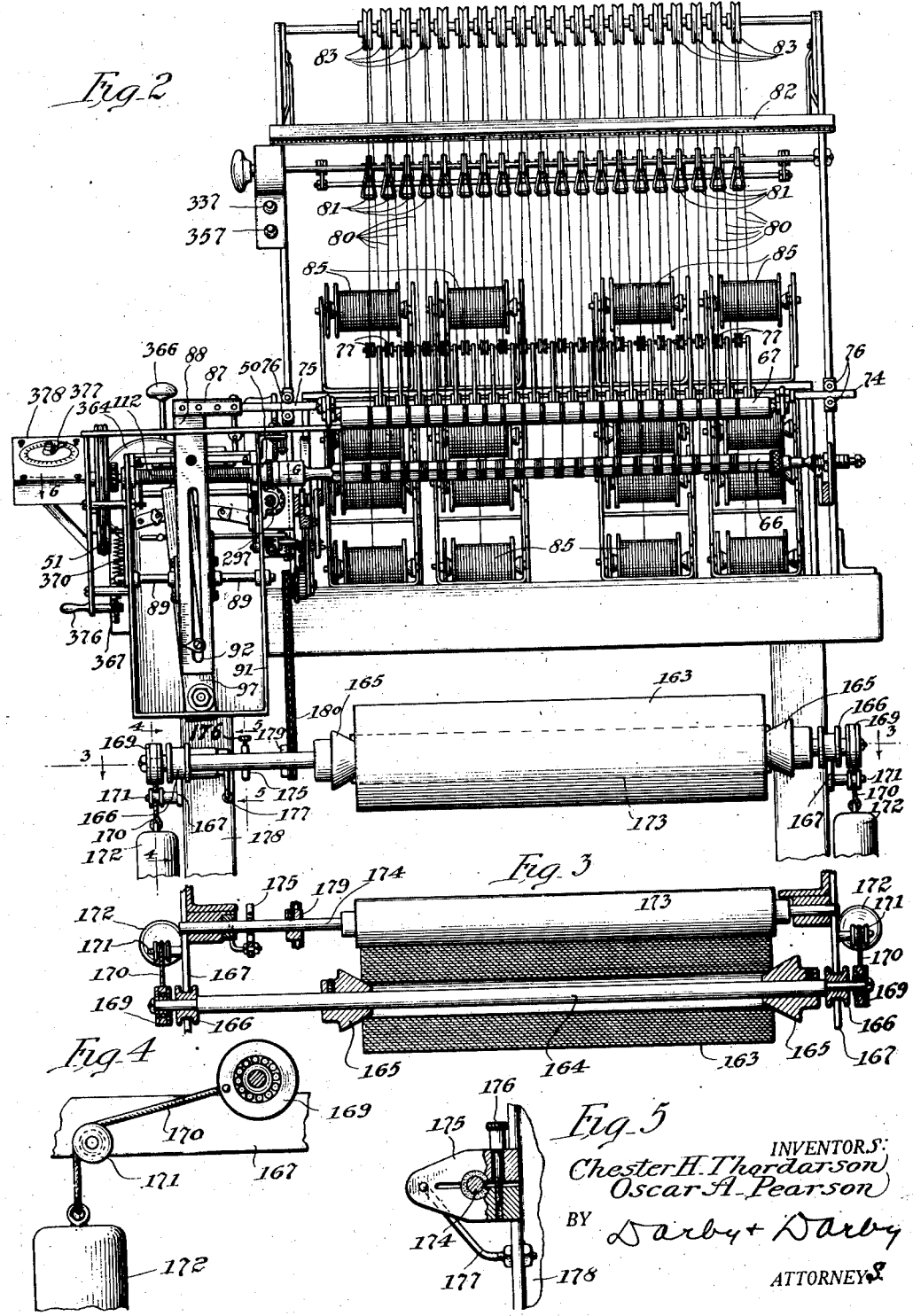
INVENTORS:
Chester H. Thordarson
Oscar A. Pearson
BY Darby + Darby
ATTORNEYS

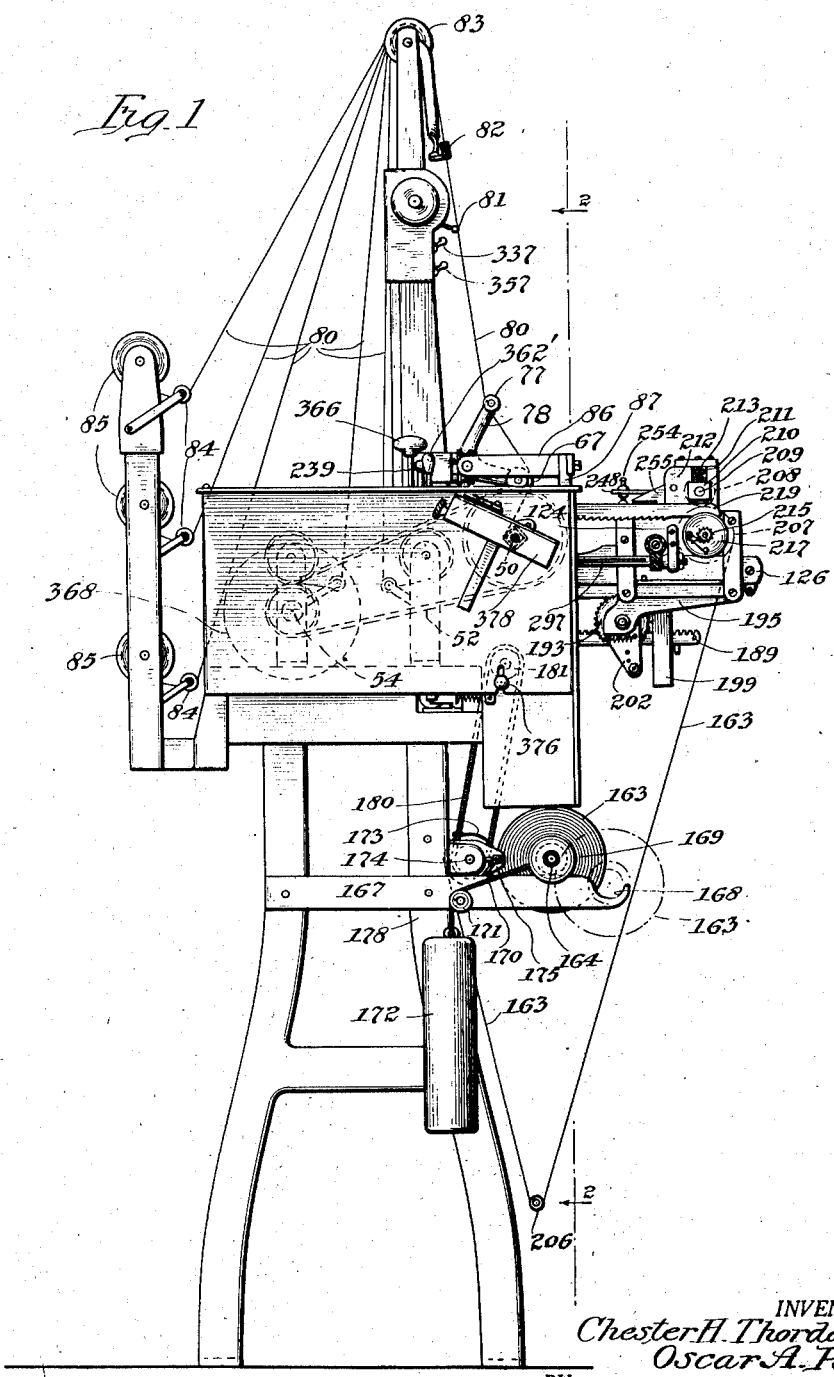

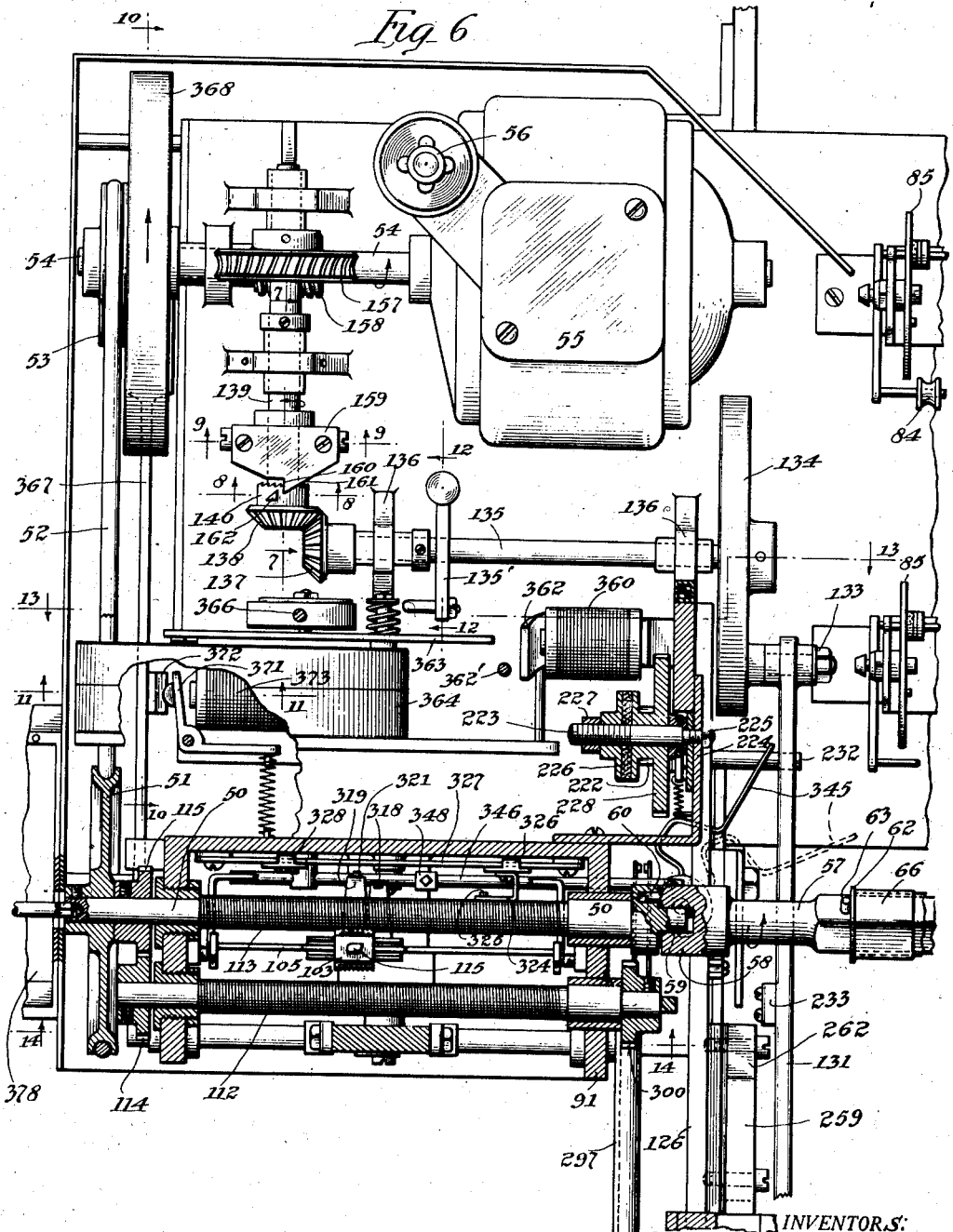

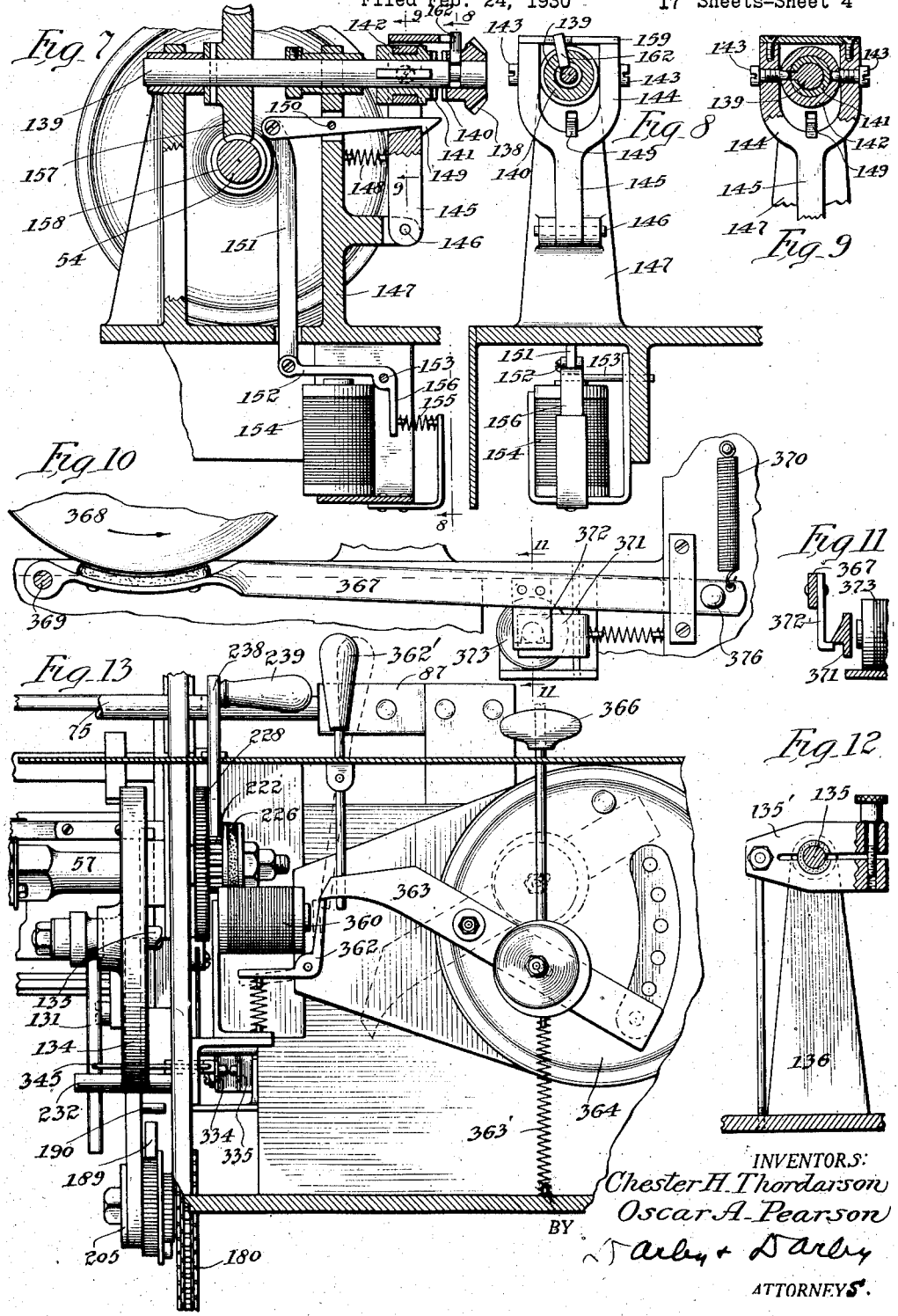

Feb. 27, 1934.     C. H. THORDARSON ET AL     1,948,776
MACHINE FOR WINDING COILS
Filed Feb. 24, 1930     17 Sheets-Sheet 5
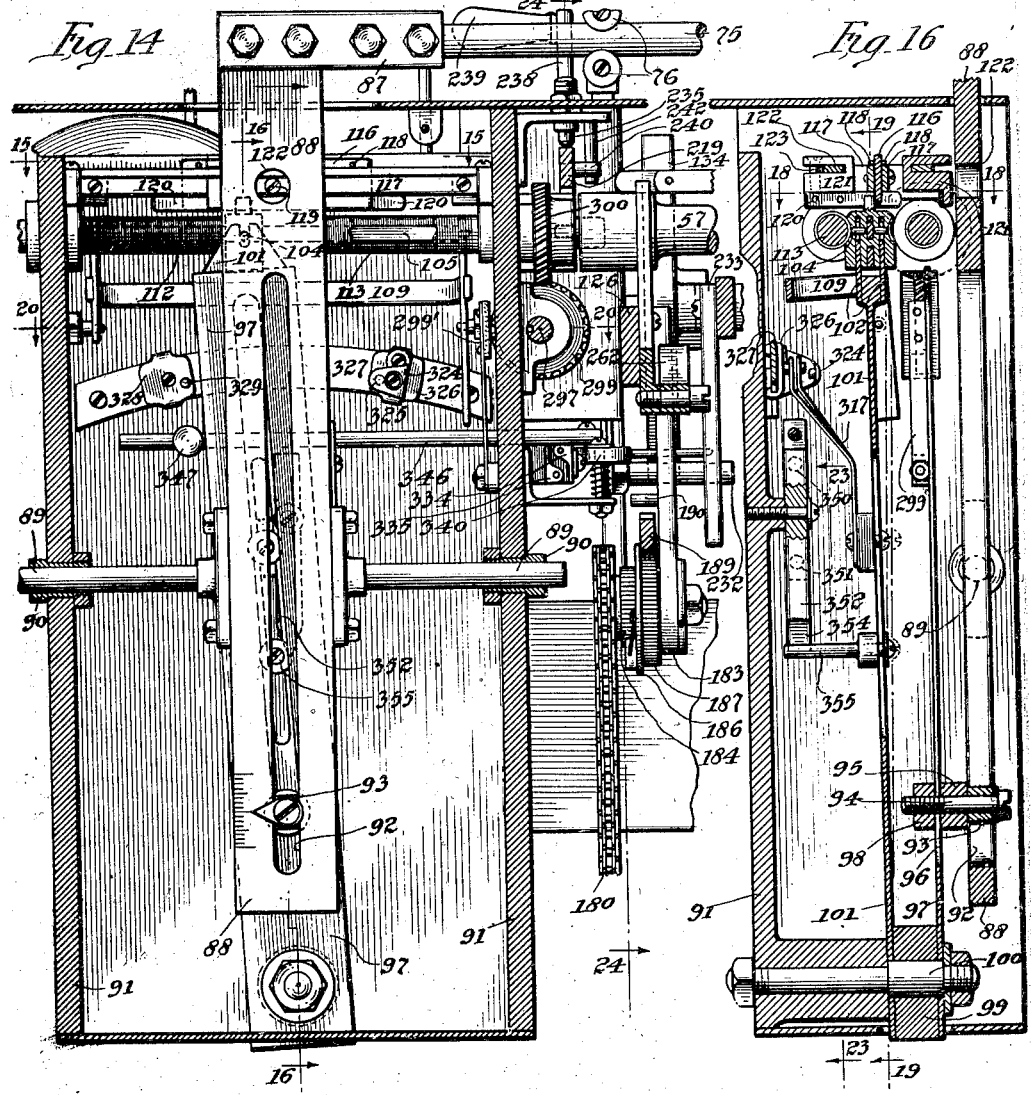
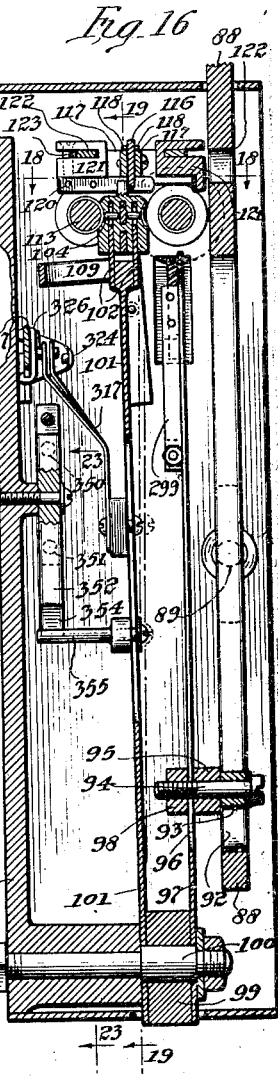
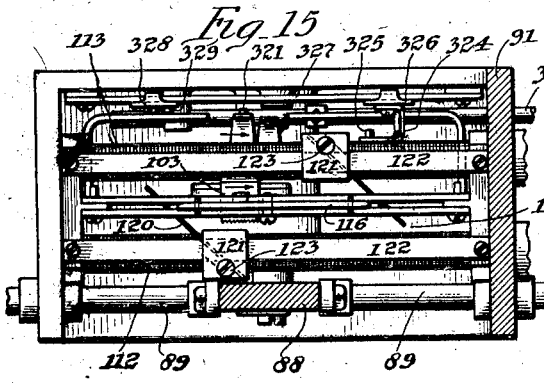
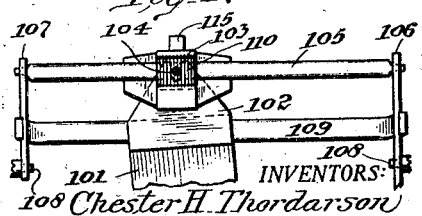
INVENTORS:
Chester H. Thordarson
Oscar A. Pearson
BY Darby & Darby
ATTORNEYS.

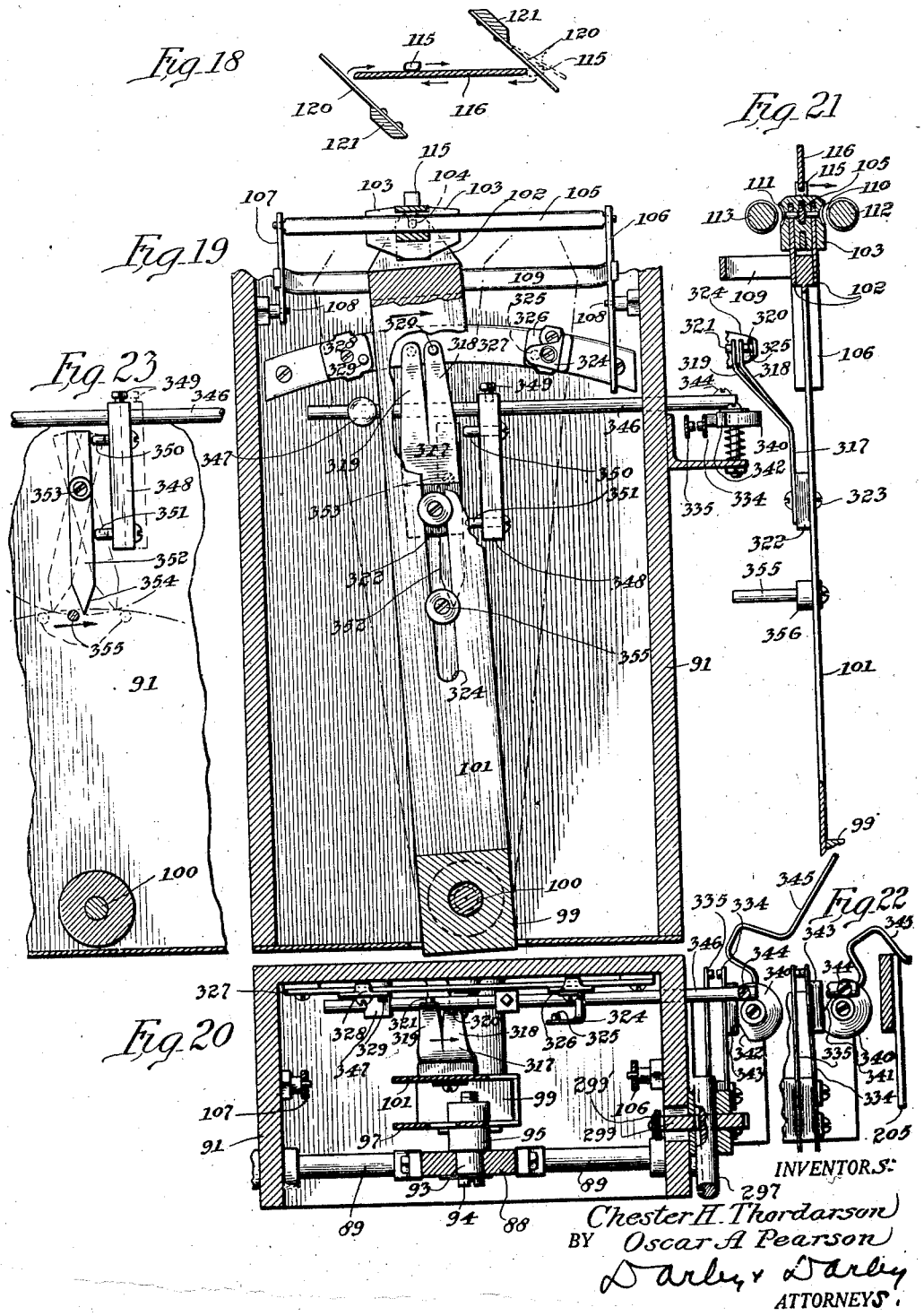

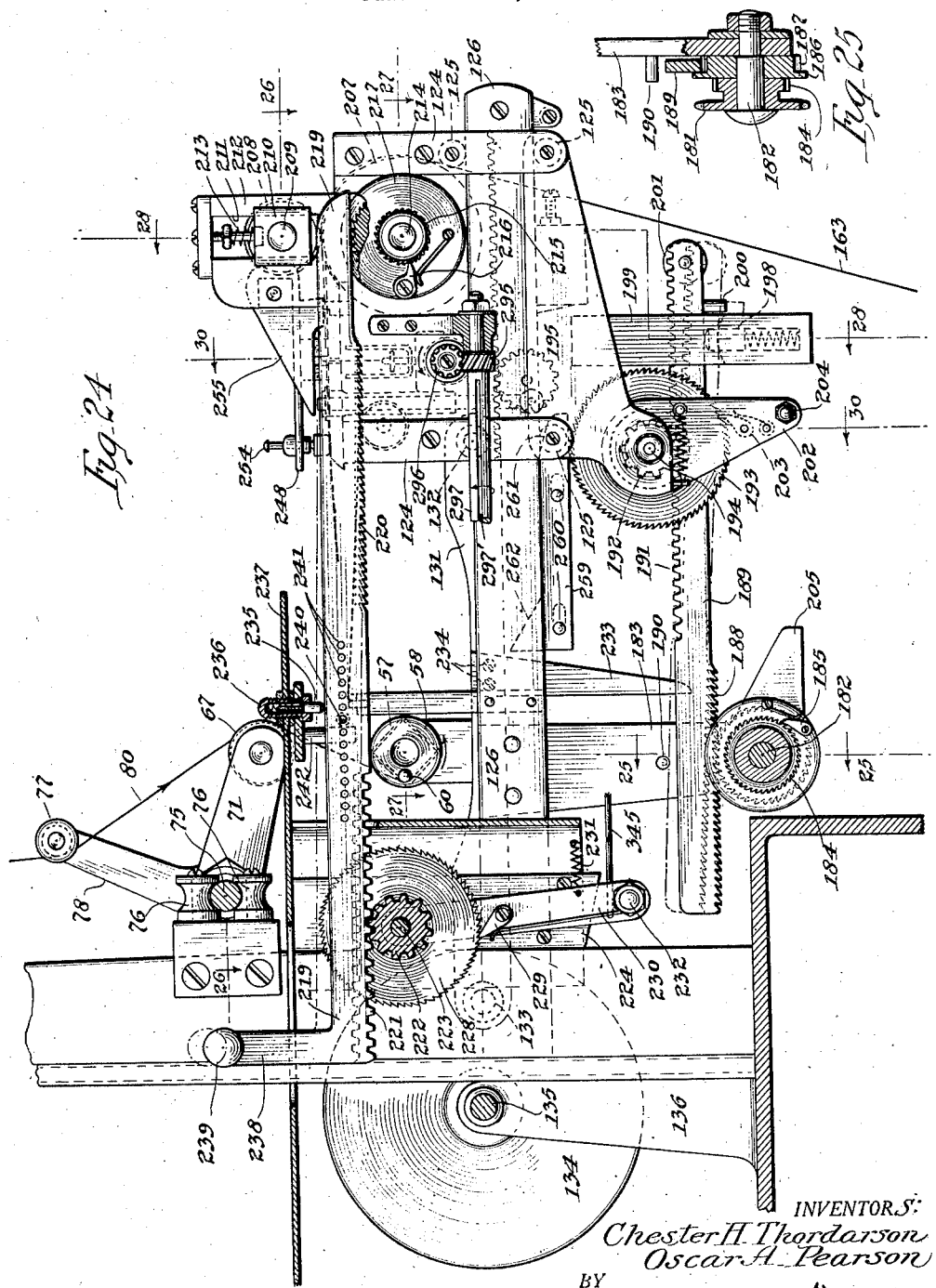

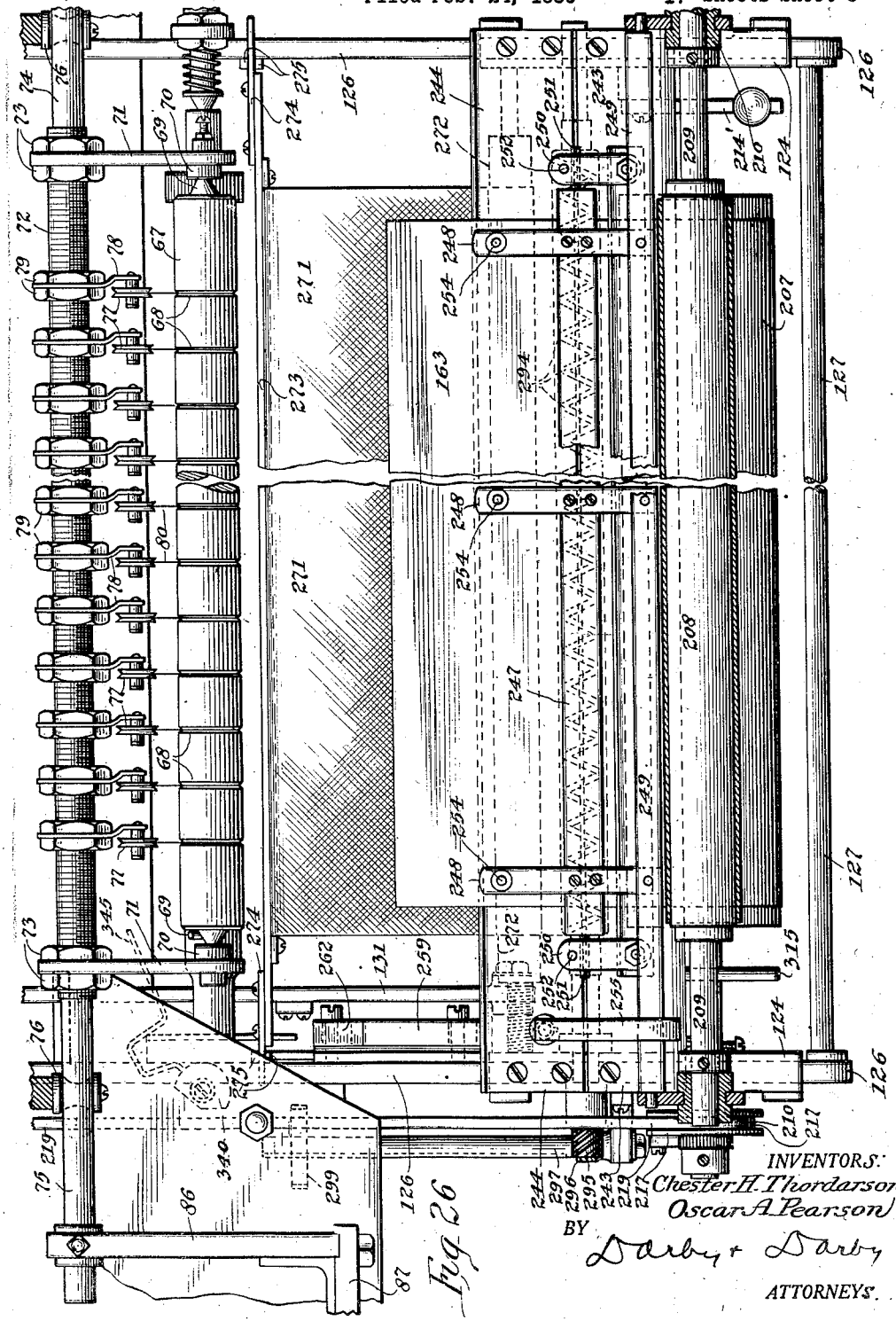

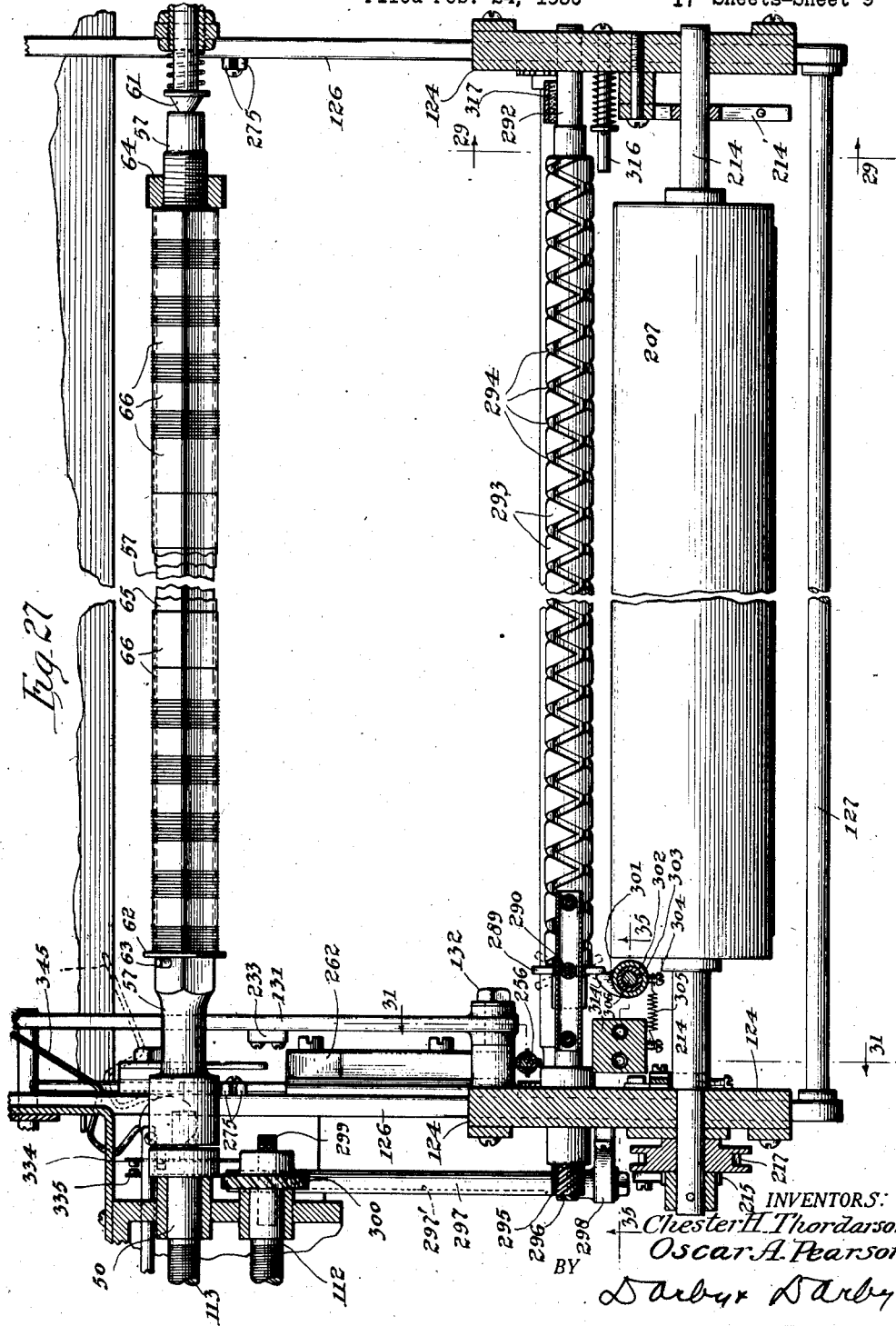

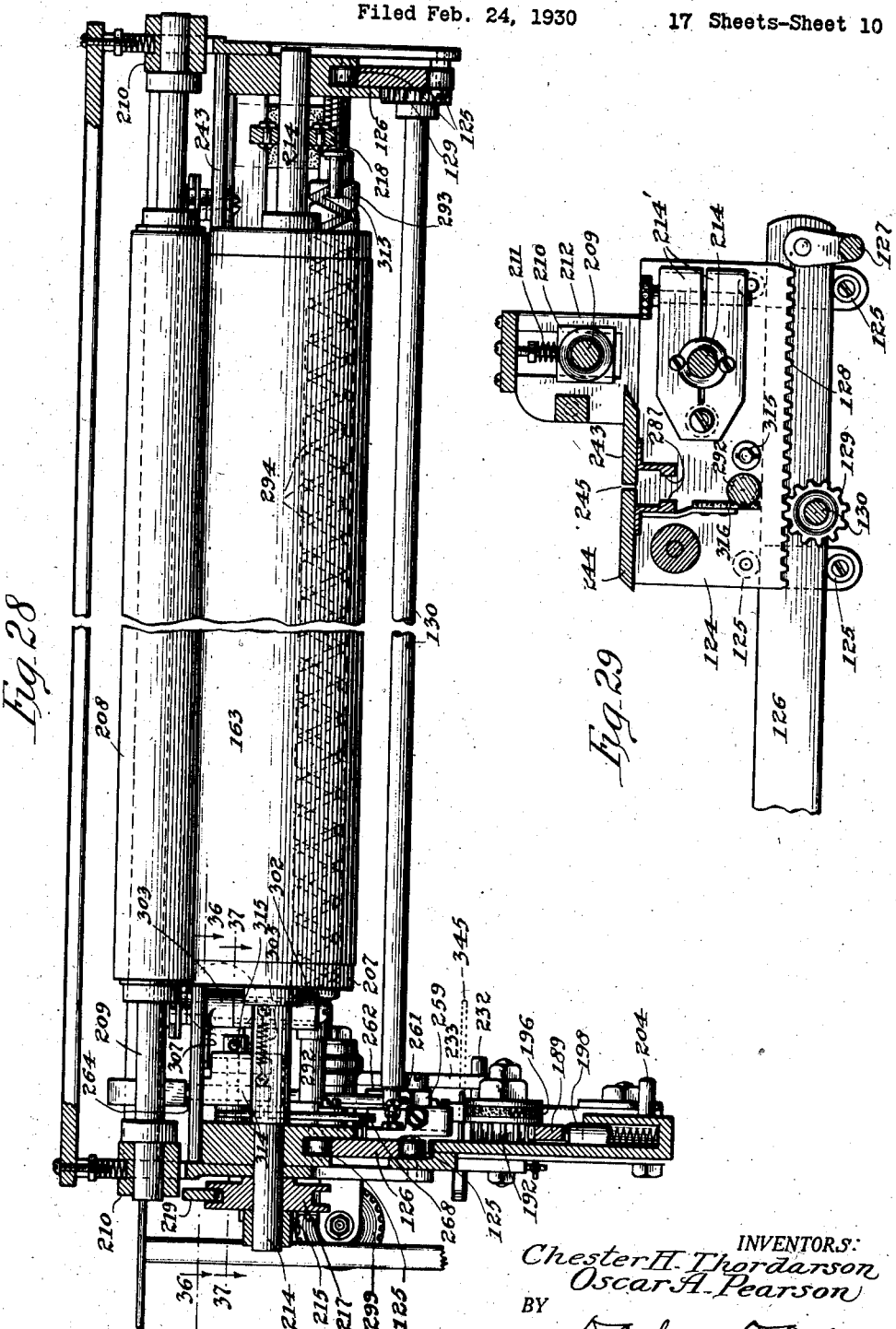

Feb. 27, 1934.  C. H. THORDARSON ET AL  1,948,776
MACHINE FOR WINDING COILS
Filed Feb. 24, 1930  17 Sheets-Sheet 11
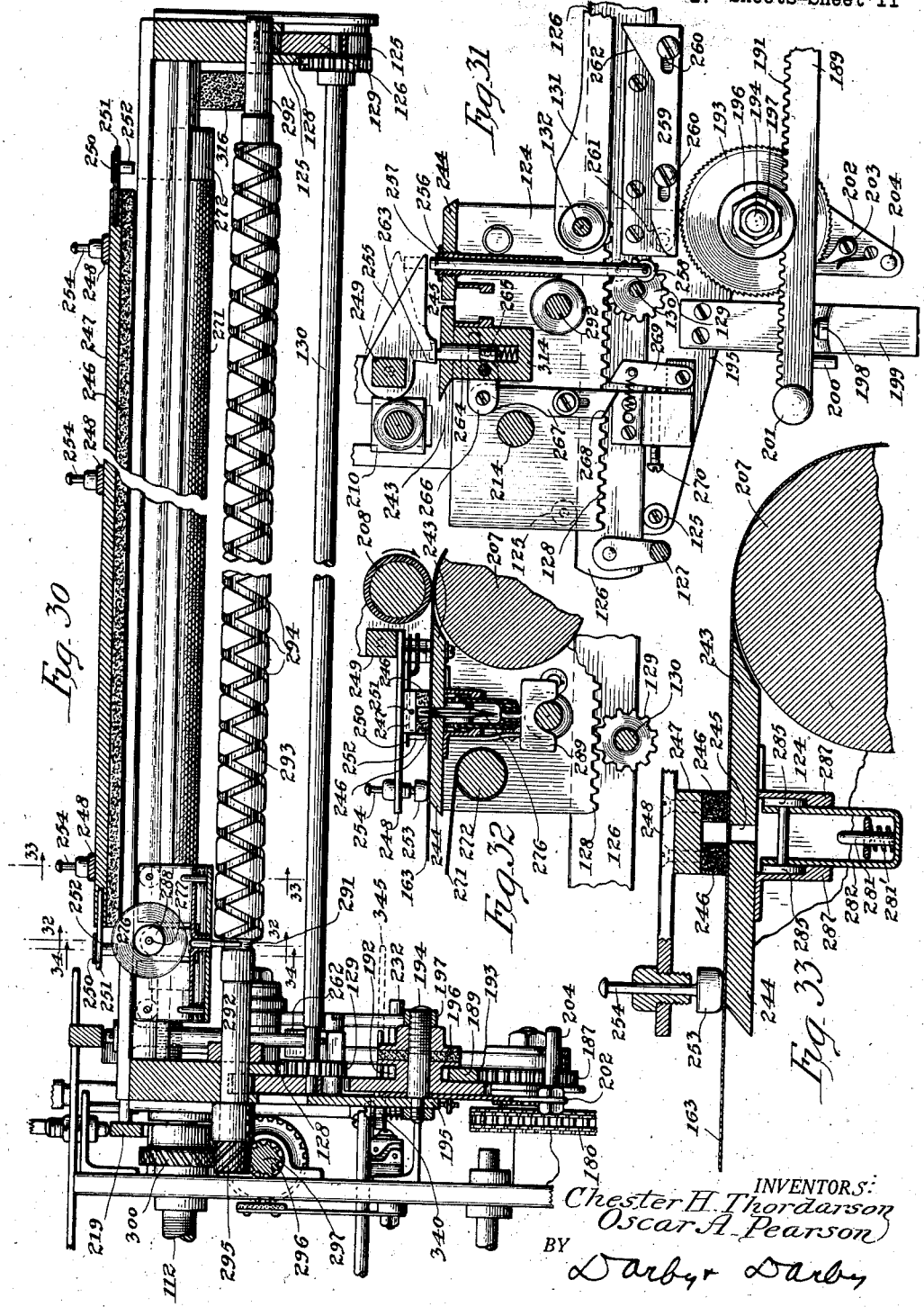
INVENTORS:
Chester H. Thordarson
Oscar A. Pearson
BY Darby & Darby
ATTORNEYS.

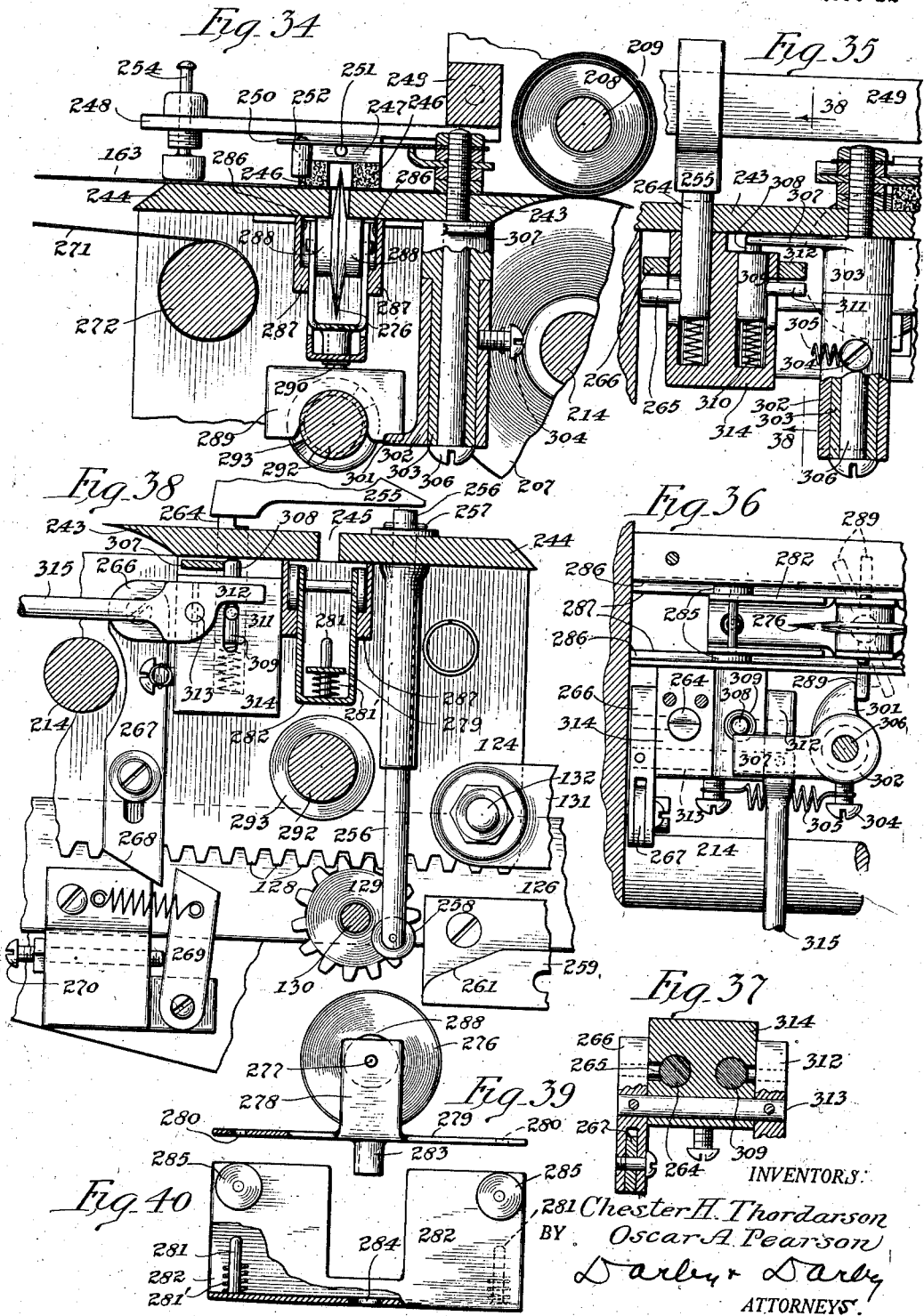

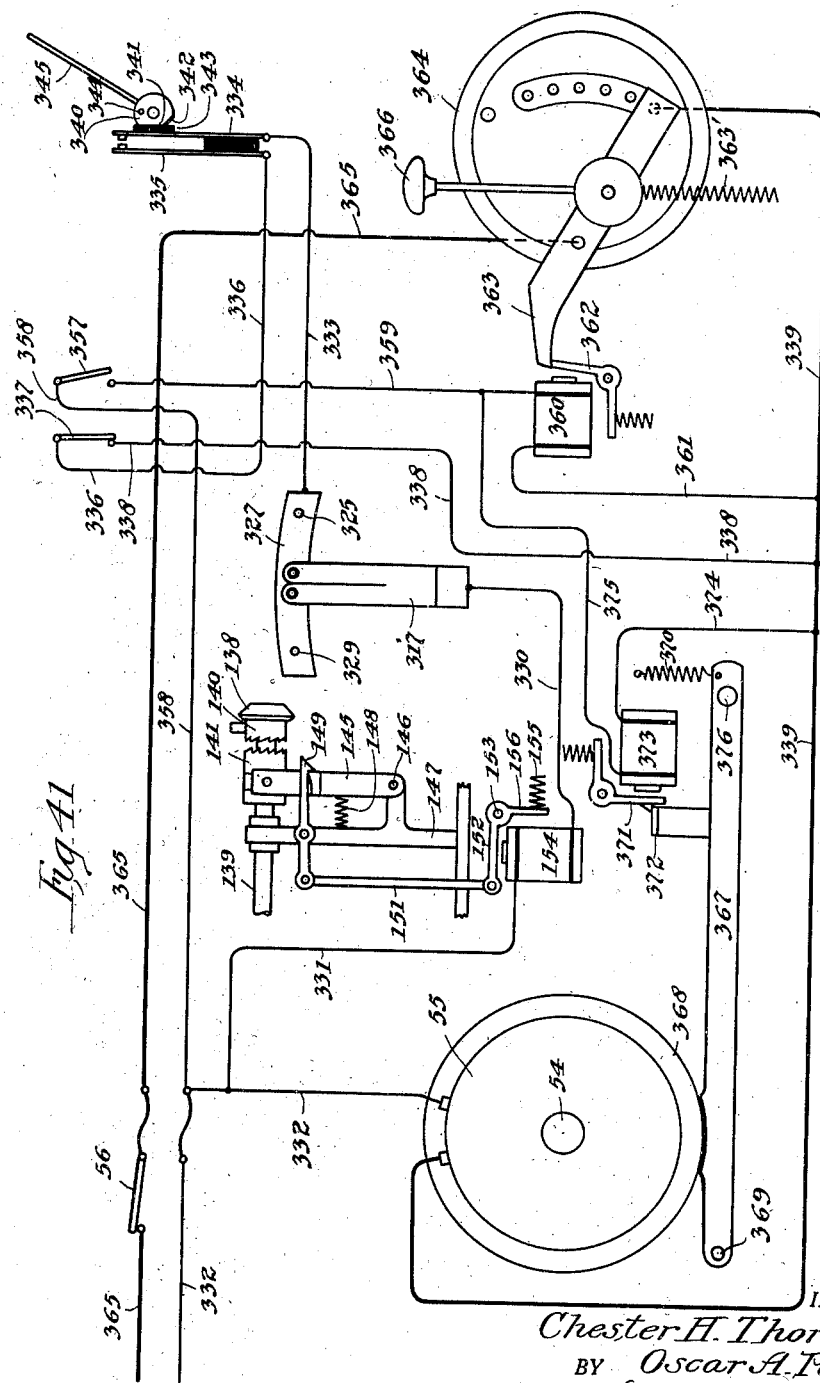

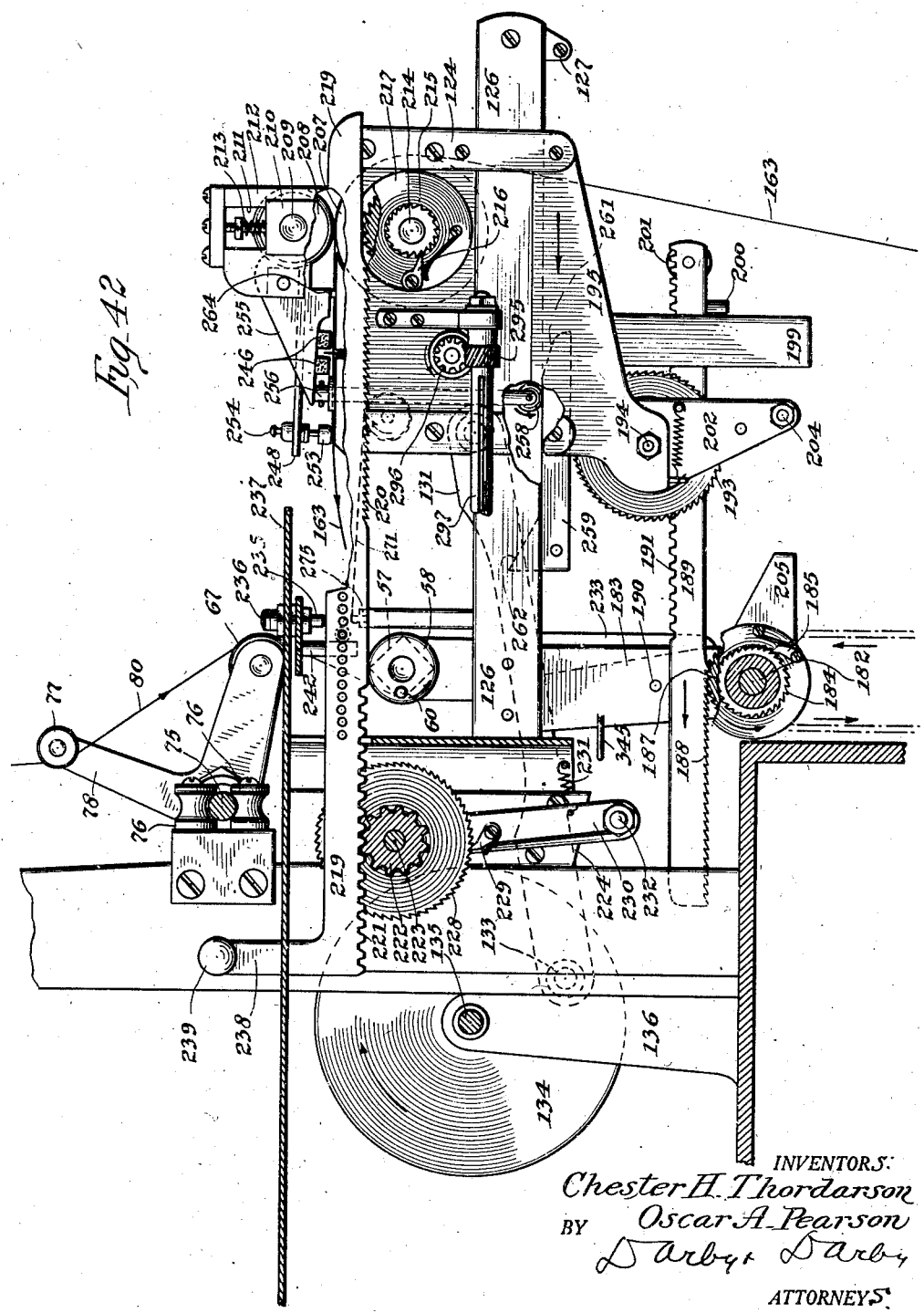

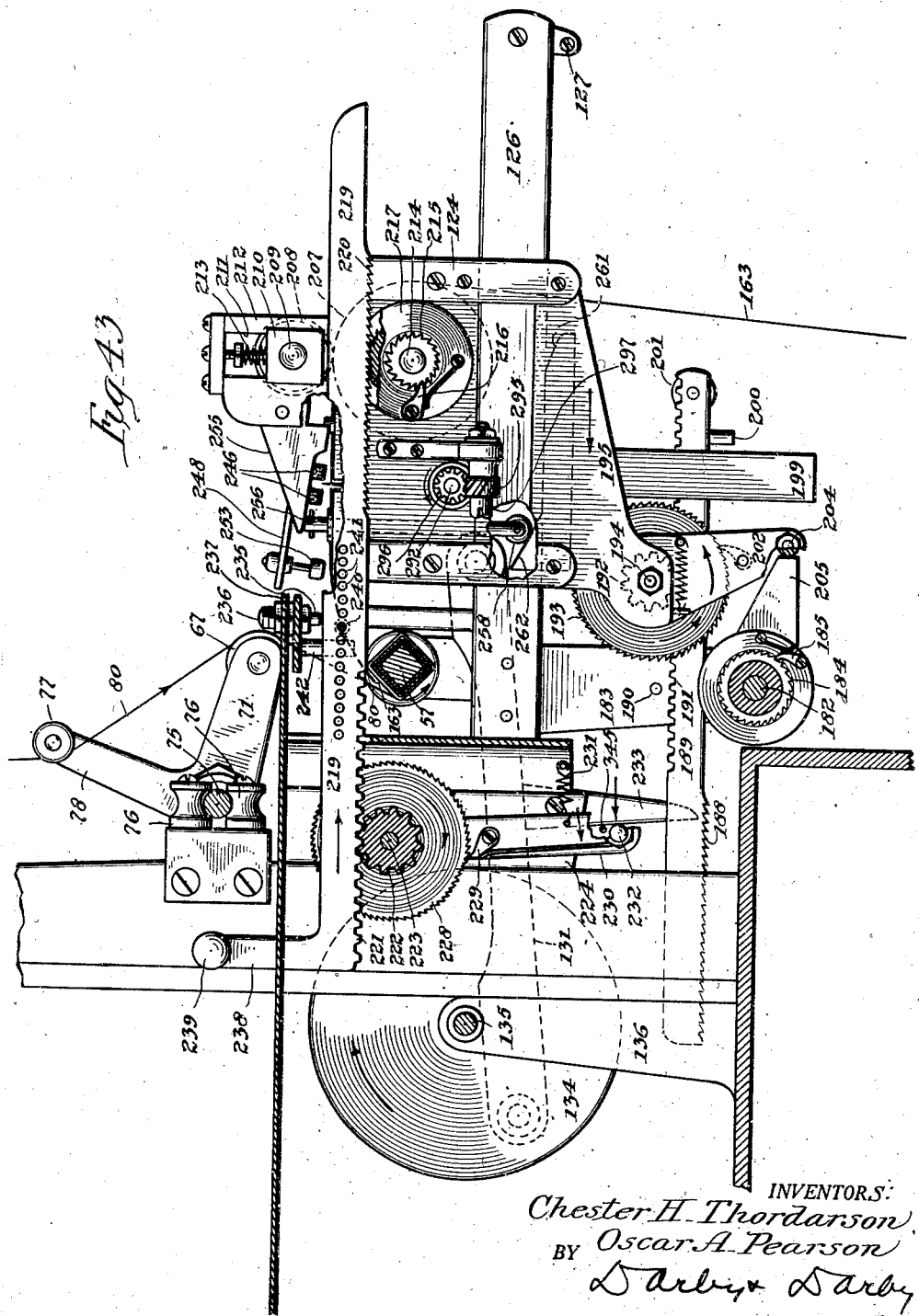

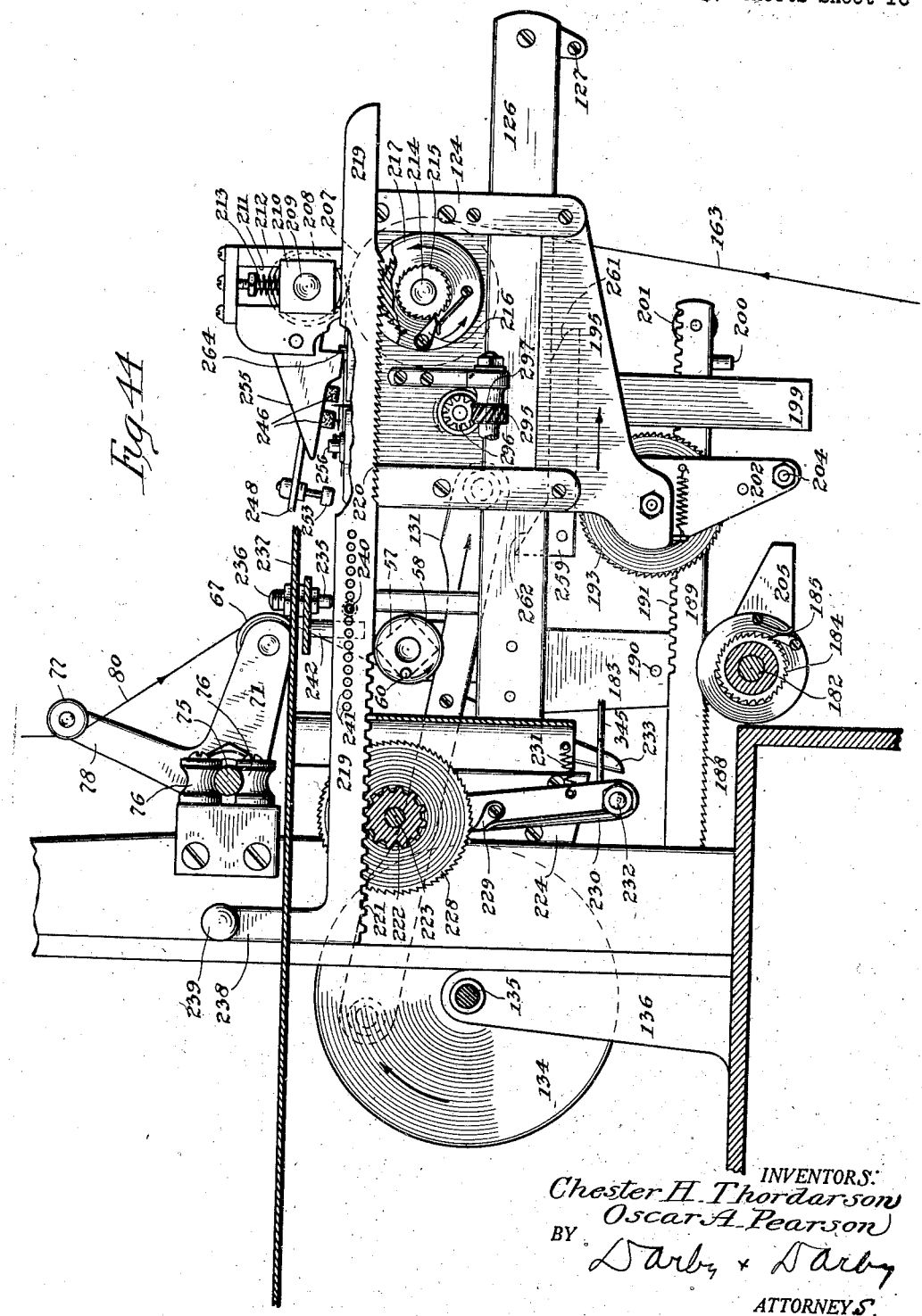

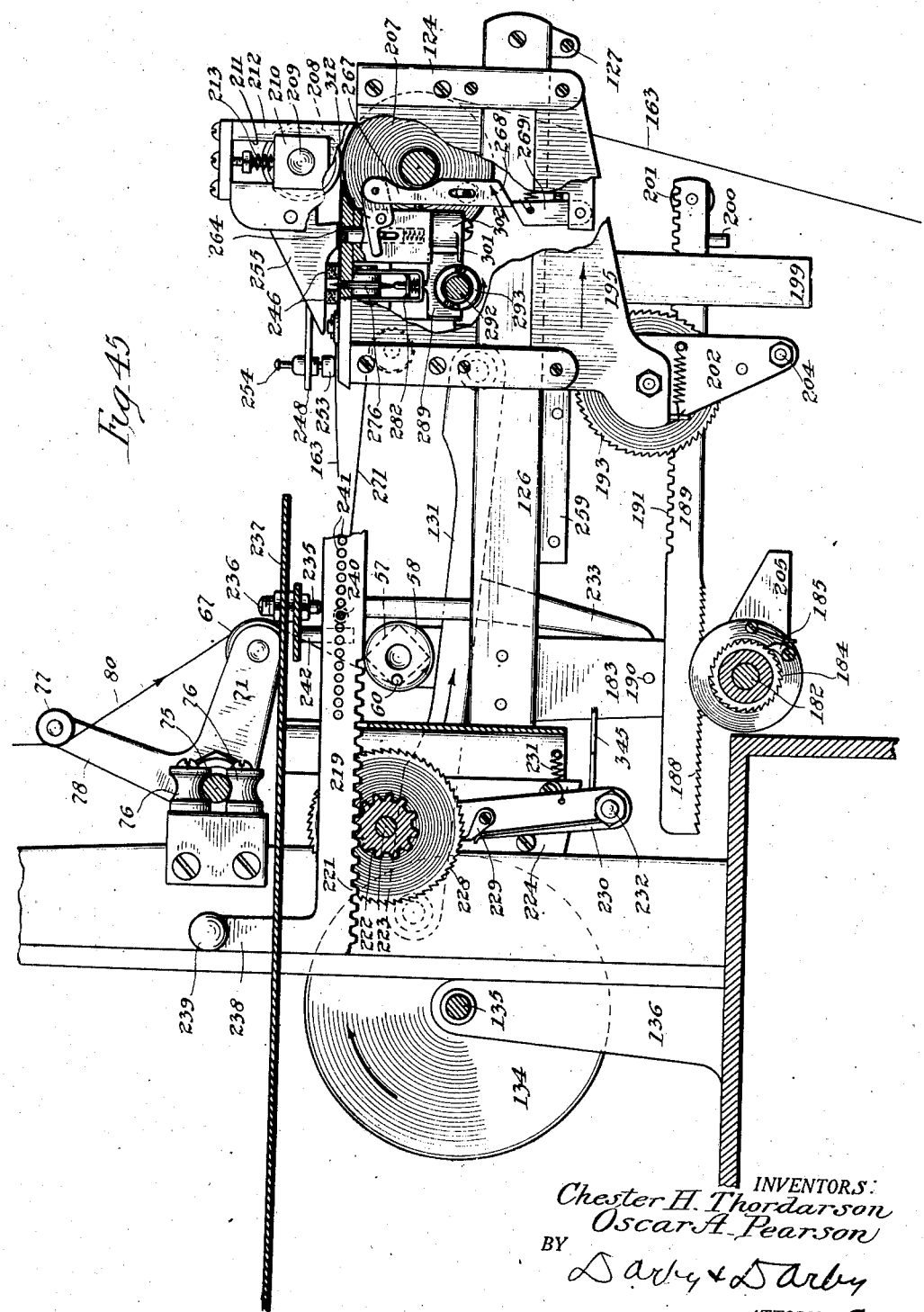

Patented Feb. 27, 1934

1,948,776

UNITED STATES PATENT OFFICE

1,948,776

MACHINE FOR WINDING COILS

Chester H. Thordarson, Chicago, and Oscar A. Pearson, Oak Park, Ill., assignors to Thordarson Electric Manufacturing Company, Chicago, Ill., a corporation of Illinois Application February 24, 1930. Serial No. 430,846

11 Claims. (Cl. 242—10)

This invention relates to an improved machine for winding coils for electrical purposes, the primary object of the present invention being to provide an improved machine of this character equipped with automatic means providing effective insulation between the layers of such coils.

Another object of the invention is the provision of a machine of the character indicated equipped with means for withdrawing sections from a roll of flexible insulating material such as paraffin paper and automatically inserting said sections between the layers of the coils wound upon the machine.

Another object of the invention is the provision of means for varying the lengths of said insulating sections to compensate for the constantly increasing diameter of the coils.

Other objects will appear hereinafter.

The invention consists in the combinations and arrangements of parts hereinafter described and claimed.

The invention will be best understood by reference to the accompanying drawings forming a part of this specification, in which, Fig. 1 is an end view of a machine embodying the invention;

Fig. 2 is a front view of the same taken on the line 2—2 of Fig. 1;

Fig. 3, a section taken on line 3—3 of Fig. 2;

Fig. 4, an enlarged section taken on line 4—4 of Fig. 2;

Fig. 5, an enlarged section taken on line 5—5 of Fig. 2;

Fig. 6, an enlarged section taken on line 6—6 of Fig. 2;

Fig. 7, a section taken on line 7—7 of Fig. 6;

Fig. 8, a section taken on lines 8—8, of Figs. 6 and 7;

Fig. 9, a section taken on lines 9—9, of Figs. 6 and 7;

Fig. 10, a section taken on line 10—10, of Fig. 6;

Fig. 11, a section taken on lines 11—11, of Figs. 6 and 10;

Fig. 12, a section taken on line 12—12 of Fig. 6;

Fig. 13, a section taken on line 13—13 of Fig. 6;

Fig. 14, a section taken on line 14—14, of Fig. 6;

Fig. 15, a section taken on line 15—15, of Fig. 14;

Fig. 16, a section taken on line 16—16, of Fig. 14;

Fig. 17, a detail view of the upper end of a reversing lever employed in conjunction with the mechanism for laying the layers of wires on the coils;

Fig. 18, a diagrammatic section taken substantially on line 18—18, of Fig. 16;

Fig. 19, a section taken substantially on line 19—19 of Fig. 16 with portions broken away for the sake of clearness;

Fig. 20, a section taken on line 20—20, of Fig. 14;

Fig. 21, a detail section through the upper portion of the reversing lever;

Fig. 22, a detail plan view of the main controlling switch of the paper feeding mechanism shown in a different position from that illustrated in Fig. 20;

Fig. 23, a diagrammatic section taken on line 23—23 of Fig. 16;

Fig. 24, a section taken on line 24—24 of Fig. 14;

Fig. 25, a section taken on line 25—25 of Fig. 24;

Fig. 26, a section taken on line 26—26, of Fig. 24;

Fig. 27, a section taken on line 27—27, of Fig. 24;

Fig. 28, a section taken on line 28—28, of Fig. 24;

Fig. 29, a section taken on line 29—29, of Fig. 27;

Fig. 30, a section taken on line 30—30 of Fig. 24;

Fig. 31, a section taken on line 31—31, of Fig. 27;

Fig. 32, a section taken on line 32—32, of Fig. 30;

Fig. 33, a section taken on line 33—33 of Fig. 30;

Fig. 34, a section taken on line 34—34 of Fig. 30;

Fig. 35, a section taken on line 35—35 of Fig. 27;

Fig. 36, a section taken on line 36—36 of Fig. 28;

Fig. 37, a section taken on line 37—37, of Fig. 28;

Fig. 38, a section taken on line 38—38, of Fig. 35;

Fig. 39, a detail view of a paper cutter or slitter employed in the machine;

Fig. 40 a detail view of a carriage for carrying said paper cutter or slitter;

Fig. 41, a diagrammatic view illustrating the electric circuits employed in the machine;

Fig. 42, a view similar to Fig. 24, but showing the positions of the operative parts of the machine at a little later period;

Fig. 43, a view similar to Fig. 42, but showing the positions of the parts at a little later period;

Fig. 44, a view similar to Fig. 43, but showing the positions of the parts at a little later period;

Fig. 45, a view similar to Fig. 44, but showing the positions of the parts at a still later period.

The preferred form of construction as illustrated in the drawings comprises an operating shaft 50 mounted in the frame of the machine, as best illustrated in Fig. 6. The shaft 50 is driven by means of a grooved pulley 51 connected by a belt 52 with a grooved pulley 53 on the motor shaft 54 of an electric motor 55 mounted as indicated in the frame of the machine and provided with a suitable hand control switch 56 for controlling the operation thereof. By this arrangement, it will be noted that the operating shaft 50 will be constantly driven whenever the motor 55 is in operation.

Cooperating with the shaft 50 is a work mandrel or bar 57 arranged in axial alignment therewith, said mandrel being provided with an enlarged socket 58 fitting over a reduced end 59 on shaft 50, a pin 60 engaging a socket as shown, locking said parts against relative rotation. As best shown in Fig. 27, the other end of the mandrel 57 has a bearing on a yieldable spring-held cone bearing 61 and whereby said mandrel may be readily removed from the machine by retracting said cone bearing, as will be readily understood. A stop washer 62 is arranged at the end of the mandrel 57 adjacent the socket 58, resting against a stop pin 63, as shown. A clamping nut 64 is threaded on the other end of the mandrel 57 to cooperate with the washer 62 to serve as a means for clamping a square metallic sleeve or tube 65 and square fiber tube or cardboard tube sections 66 on said mandrel as indicated in Fig. 27. The cardboard sections 66 constitute the cores for the various coils to be wound on the machine.

As best shown in Figs. 1, 24 and 26, an elongated guide roller 67 is arranged in close cooperative relationship with the mandrel 57, said guide roller being provided with a plurality of V-shaped guide grooves 68, there being one of said guide grooves for each of the cardboard core sections on said mandrel. The guide roller 67 is mounted on cone bearings 69 at each end thereof, bearing in blocks 70 on the ends of arms 71 mounted on threaded supporting rod 72 and secured in place thereon by means of lock nuts 73. The ends 74 and 75 of the supporting rod 72 are reduced in diameter as shown and operate freely through suitable grooved guide rollers 76 arranged on the frame of the machine, as best shown in Figs. 14, 24 and 26. Individual grooved guide rollers 77 are mounted on arms 78 secured to the supporting rod 72 by lock nuts 79, one of said guide rollers 77 being positioned in registration with each of the guide grooves 68 and thus adapted and arranged to guide wires 80 into said grooves 68. As best shown in Figs. 1, 2, 24 and 26, the wires 80 are threaded in the machine over the guide roller 67 under the guide rollers 77 contacting with controller members 81 passing through wipers 82 over guide rollers 83, under guide rollers 84 to spools or reels 85 mounted on the frame of the machine, as will be readily understood by those skilled in this art, and by which arrangement the wires 80 will be wound or coiled upon the core sections 66 as the mandrel 57 turns or rotates.

As best shown in Fig. 26, the end 75 of the supporting rod 72 is connected by a bar 86 with a plate 87 at the top of a cross head 88, best shown in Fig. 14. The cross head 88 is supported on guide rods 89 sliding through suitable bearings 90 in opposite sides of the casing 91 forming a part of the frame of the machine. The cross head 88 is provided with a vertical slot 92 having a slide block 93 vertically adjustable therein, as best shown in Fig. 16. The slide block 93 is rendered readily adjustable by means of a binding screw 94 passing through a spacing block 95, a vertical slot 96 in a vertical lever 97 and held in place by means of a clamping nut 98 and whereby the lever 97 is adjustably secured and connected with the cross head 88. The lever 97 is rigidly secured to a block 99 oscillating freely upon a stud shaft 100 mounted as shown at the bottom of the casing 91. A second vertical lever 101 is also secured, as shown, to the block 99 and whereby the levers 97 and 101 are rigidly secured together. The lever 101 is made of thin, wide spring steel so as to be flexible laterally and carries at its upper end two slotted supporting plates 102 fitting loosely into notches in the bottom of a block or nut member 103, as best shown in Figs. 19 and 21. The supporting plates 102 are notched at their upper ends to loosely engage supporting pins 104 in the block 103 and whereby the block 103 is given a rocking mounting on the upper end of the lever 101. The block 103 also slides freely on a longitudinal guide bar 105, passing loosely through a slot in said block as shown. The guide bar 105 is supported at opposite ends on rocker arms 106 and 107 pivoted on pivot pins 108 mounted on the sides of the casing 91, as best shown in Fig. 19, and whereby the block 103 will be nicely guided in its longitudinal movements and yet free to oscillate longitudinally and swing laterally.

The arms 106 and 107 are connected by a bail or bent bar 109 which compels simultaneous operation or rocking thereof. The block 103 is provided in opposite sides with threaded recesses or sockets 110 and 111 adapted, respectively, to fit and engage a threaded shaft 112 and a threaded portion 113 of the main operating shaft 50 of the machine. The shafts 112 and 113 are similarly threaded and are connected by means of gears 114 and 115 so that the shaft 112 will be compelled to rotate in a direction opposite to the shaft 113 but at the same speed. By this arrangement, it will be apparent that when the block 103 is moved into engagement with one threaded shaft, it will be caused to travel in one direction by the threads thereon; and when swung into engagement with the other shaft, it will be caused to travel in an opposite direction.

The block 103 being properly secured to the upper end of the lever 101, the movements of said block will impart swinging movements to the said lever, and said swinging movements will serve to oscillate the lever 97 and consequently reciprocate the cross head 88. Obviously, reciprocation of the cross head 88 causes corresponding reciprocation of the guide roller 67 and consequent travel of the wires 80 on the core sections 66. It is also obvious that when the direction of movement of the block 103 is reversed as indicated, a new layer of wire will be laid or coiled over the first layer.

As best shown in Figs. 14, 18, 19 and 21, the block 103 carries centrally at its top a guide lug 115 adapted and arranged to rest against and travel along the sides of a guide bar 116 mounted in the upper portion of the casing 91. As best shown in Fig. 16, the guide bar 116 is supported between two adjacent parallel supporting bars 117 and supported thereon by means of supporting pins 118 and clamped by central clamping screw 119 whereby the guide bar 116 is detachably mounted in central position above the block 103. Cooperating with the guide plate 116 are two shifting guide springs 120, best shown in Figs. 14, 16 and 18. The guide springs 120 are mounted on the bottoms of supporting blocks 121 slidable on guide bars 122 and adjustably secured thereto by means of clamping screws 123 whereby said blocks and springs may be readily adjusted on the bars 122 with reference to the ends of the guide plate 166. The lower end of the guide plate 116 is set in the path of the lug 115 so that said lug will be forced to travel along one side or the other of said guide plate. As the lug approaches each end of the guide plate, it encounters one of the springs 120, flexing said spring as indicated by the dotted lines in Fig. 18 until said lug passes the end of the guide plate 116, whereupon the spring will cause the lug 115 to pass across the end of the guide plate 116 to the other side thereof. This lateral movement of the guide lug 115 swings the block 103 over into engagement with the threaded shaft 112, thereby automatically reversing the direction of movement of the block 103. When the other end of the guide plate 116 is approached, the other shifting spring 120 is encountered by the lug 115 and said lug forced over and around the other end of the guide plate 116, thereby forcing the block 103 back into operative engagement with the threaded shaft 113, again reversing the direction of travel of the block 103.

As explained above, these motions of the block 103 are imparted to the guide roller 67, and the wires 80 are thereby caused to be laid or coiled in layers upon the core sections 66.

Obviously, by substituting plates 116 of different lengths and correspondingly adjusting the springs 120, the length of longitudinal travel of the guide roller 67, and consequently the lengths of the coils wound, may be varied as desired within the limits of the machine.

The mechanism already described is an elaboration, extension and improvement on the machine illustrated and described in the patent to Chester H. Thordarson, No. 1,482,592, granted February 5, 1924, and constitutes no part of the present invention except insofar as the parts already described cooperate with those to be presently described.

As has been previously indicated, the coils formed on the core sections 66 will be laid or wound thereon in layers, one layer corresponding with each longitudinal travel of the block 103. It is highly desirable to insert insulation between the different layers of the coils, and the present invention has special relation to automatic mechanism which we have provided for this purpose.

To this end we provide a reciprocatory carriage 124, best shown in Figs. 1, 24, 26 and 27, said carriage being arranged to slide toward and away from the mandrel 57 upon rollers 125 running upon two parallel supporting tracks or rails 126 secured at their rear ends, as shown, to the frame of the machine and cross-connected at their front ends by a connecting rod or bar 127. Rack bars 128, best shown in Fig. 29, arranged at the lower edges of opposite sides of the carriage 124 enmesh with pinions 129 on a transverse equalizing shaft 130, said arrangement serving to equalize the travel of opposite sides of the carriage and prevent twisting or cramping thereof on the tracks 126.

The carriage 124 is reciprocated by means of a connecting rod 131 pivoted at 132 to one side of said carriage and connected at its rear end with a crank pin 133 on a fly wheel 134 on a counter shaft 135 mounted in standards 136 on the frame of the machine. A frictional braking element 135' is connected with shaft 135, as best shown in Fig. 12, to prevent overrunning or spinning of the parts. As best shown in Fig. 6, the counter shaft 135 is connected by a beveled gear 137 meshed with a beveled gear 138 on another counter shaft 139 arranged at right angles to the counter shaft 135. The beveled gear 138 is loose on the shaft 139 and carries a clutch member 140 cooperating with a clutch member 141 splined to the shaft 139, as best shown in Figs. 7, 8 and 9. The clutch member 141 carries a loose ring 142 pivotally connected, by means of screws 143, with yoke arms 144 at the upper end of an oscillating lever 145 pivoted at 146 on a standard 147 on the frame of the machine. The clutch member 141 is normally pressed toward engagement with the clutch member 140 by means of a compression spring 148 imprisoned between the lever 145 and the standard 147. The clutch member 141 is normally held in retracted position by means of a notched detent 149 pivoted at 150 in the standard 147, the rear end of the detent 149 being connected by a link 151 with an armature 152 pivoted at 153 in cooperative relationship with an electro-magnet 154. The armature 152 is normally held in elevated position by means of a compression spring 155 engaging a depending arm 156 formed integrally with said armature. The shaft 139 carries a worm wheel 157 meshed with a worm 158 on the motor shaft 54, so that the shaft 139 will be constantly driven in the direction of the arrow on Fig. 6 whenever the motor 55 is operated. The lever 145 carries at its upper end a cam plate 159 having a notch 160 and an inclined cam surface 161 cooperating with a lug or arm 162 on the clutch member 140.

The arrangement is such that upon excitation of the magnet 154 the armature 152 will be drawn downwardly, thus releasing the detent 149 from the lever 145 and permitting the clutch member 141 to engage the clutch member 140, thereby operating the shaft 135 to reciprocate the carriage 124. Toward the end of the resulting revolution of shaft 135, the lug 162 comes into contact with the cam surface 161, thereby forcing the clutch member 141 out of engagement with the clutch member 140 to stop the reciprocation of the carriage 124 after one complete operation thereof inwardly and rearwardly and then outwardly and forwardly to original position, as will be readily understood. Thus, at each excitation of the magnet 154 the carriage 124 will be caused to perform one complete reciprocation and return to original position.

The insulation which is inserted by the machine between the layers of the coils formed on the core section 66 is in the form of paraffin paper. This paper is furnished in the form of a continuous strip 163 wound into a roll, as best shown in Figs. 1, 2 and 3. The roll of paper is mounted, as shown, on a shaft 164, being held in position thereon by means of removable and adjustable cone bearing blocks 165. At each end the shaft 164 carries grooved bearing rollers 166 running upon guide tracks or rails 167 projecting forwardly, as shown, from the frame of the machine. At their forward ends the tracks 167 are provided with notches 168 adapted and arranged to receive the rollers 166 and serving as a support or rest for the paper roller when the machine is not in operation. At its extreme ends the shaft 164 carries two loose rings or collars 169 mounted thereon upon ball bearings, as shown. Each of the rings 169 is connected with one end of a cord or cable 170 running over a corresponding grooved guide pulley 171 and connecting with a weight 172 whereby the paper roll 163 is yieldingly and adjustably pressed against a feed roller 173 mounted between the tracks 167 and whereby compensation is made for the constantly decreasing diameter of the paper roll as the paper is withdrawn therefrom.

The feed roller 173 is carried by a shaft 174 having a friction clamp 175 clamped thereon by a binding screw 176 and anchored against rotation by means of an anchor arm 177 secured to a standard 178 of the frame of the machine, and whereby suitable adjustable retarding friction is placed upon the paper feed so as to prevent spinning or over-running thereof during operation. The shaft 174 is operated by means of a sprocket 179 driven by a sprocket chain 180 from a sprocket wheel 181 shown in detail in Fig. 25. The sprocket wheel 181 is mounted on a stud shaft 182 secured in a depending hanger 183 on the frame of the machine, as best shown in Fig. 24. The sprocket wheel 181 carries an operating ratchet 184 cooperating with a spring-held pawl 185 mounted on the outer side of a flange 186 formed on an operating pinion 187 meshing with rack teeth 188 on the underside of a rack bar 189 and whereby, upon rearward movement of the rack bar 189, the sprocket wheel 181 will be operated to operate the feed roller 173 to feed a section of the paper 163 from the paper roll, but during reverse movement of the rack bar 189 no such paper feed will take place. A stop pin 190 is arranged on the hanger 183 above the rack bar 189, permitting of limited upward movement of said rack bar to disengage the teeth 188 from the operating pinion 187. The rack bar 189 is also provided at its upper forward edge with rack teeth 191 meshing with a pinion 192, best shown in detail in Fig. 30. The pinion 192 carries a ratchet wheel 193 and is loosely mounted on a stud shaft 194 secured to a depending bracket or apron 195 on the corresponding side of the carriage 124. A friction element 196 is also mounted on the stud shaft 194 and is pressed against the inner face of the pinion 192 by means of a clamping nut 197 threaded on the inner end of the stud shaft 194, and whereby suitable retarding friction is imparted to the parts, preventing operation of the parts due to friction but permitting operation of the parts under power.

The lower forward edge of the rack bar 189 rests upon a spring-held supporting pin or button 198 mounted in a hanger 199 depending from the apron 195, and whereby the rack bar 189 is yieldingly held in cooperative relationship with the gears or pinions with which it meshes. The rack bar 189 is provided with a stop pin 200 limiting its rearward movement and with an operating handle 201 permitting manual manipulations thereof. A pawl arm 202 is loosely mounted on the stud shaft 194 and carries a spring-held pawl 203 cooperating with the ratchet 193 and whereby, upon oscillation of said pawl arm, the pinion 192 will be operated to feed the rack bar 189 slightly forward, as will be readily understood. The pawl arm 202 carries at its outer end a transverse pin 204 adapted to engage a stop arm 205 on the hanger 183 at the end of the rearward movement of the carriage 124. The arrangement is such that as the carriage moves rearwardly, the rack bar 189 will be carried along with the carriage due to the frictional clamping action of the friction element 196, thereby operating the feed roller 173 to feed a definite portion of the paper strip 163 from the paper roller. At the end of this rearward movement of the carriage 124, the pin 203 encounters the stop 205, which rocks the pawl arm 202 slightly forwardly, operating the pinion 192 to step the rack bar 189 slightly forwardly so that at the next rearward movement of the carriage 124 a slightly greater length of paper will be fed from the paper roller, said additional length of paper being provided to compensate for the gradually increasing diameters of the coils being wound upon the core sections 66. At the completion of the coil the rack bar 189 is manually disengaged from its cooperating pinions and manually reset in its proper rearward position to correspond with the initial diameters of the new coils to be wound.

The paper thus fed from the roll 163 is permitted to hang therefrom in the form of a loose loop in which is suspended a loose flanged roller 206, as best shown in Fig. 1, said flanged roller serving to keep the paper strip smooth and taut and also serving to exert a slight but constant resistance or retarding effect upon the further feeding of the paper strip into the machine. As best shown in Figs. 1, 24 and 28, the upper end of the paper strip 163 is passed over a feed roller or drum 207 and under a pressure roller 208. The pressure roller 208 is mounted on a shaft 209 having bearings at each end in blocks 210 sliding in slots 211 in standards 212 on opposite sides of the frame of the machine. Compression springs 213 serve to yieldingly press the contact roller 208 into feed contact with the paper strip 163 and the underlying feed roller 207, thereby insuring feed of the paper strip upon proper rotation of the feed roller 207. The feed roller 207 is carried by a shaft 214 having suitable bearings in opposite sides of the carriage 124. At one end the shaft 214 carries a ratchet 215 cooperating with a spring-held pawl 216 on the outer face or flange of a flanged driving ratchet or gear 217. At its other end the shaft 214 is engaged by a friction clamp 218 which serves to prevent operation of the shaft 214 under the reaction due to the friction of the parts and also prevents over-running or spinning of said shaft when it is operated. The feed ratchet or gear 217 has operative engagement with the under side of a rack bar 219 resting loosely thereon at its forward end. The rack bar 219 is provided at its under forward edge with ratchet or rack teeth 220 adapted and arranged to engage and cooperate with the ratchet 217 upon forward or outward movement of the carriage 124, thereby rotating the feed roller 207, as will be readily understood. At its rear end, the rack bar 219 is provided on its under edge with rack teeth 221 meshing with a flanged pinion 222 loosely mounted on a stud shaft 223 fixed to a hanger 224 on the frame of the machine by means of a nut 225, as best shown in Figs. 6 and 24. A frictional clamping element 226 is also mounted on the stud shaft 223 and adjustably pressed into contact with the outer face of the pinion 222 by means of an adjusting nut 227, whereby suitable friction is exerted on the pinion 222 to prevent operation thereof through friction or spinning of the parts after operation. The pinion 222 carries a larger gear or ratchet 228 cooperating with a spring-held pawl 229 on a pawl arm 230 loosely mounted on the stud shaft 223 and adapted and arranged to operate the ratchet 228 and the pinion 222 by a step-by-step movement upon oscillation of said pawl arm. The pawl arm 230 is normally held in its forward position by means of a tension spring 231 and carries at its lower end a transverse pin 232 cooperating with a depending arm 233 secured by screws 234 to the connecting rod 131. The rack bar 219 is normally held in yielding engagement with the ratchet 217 and the pinion 222 by means of a spring-held pin 235 resting substantially centrally against the upper edge thereof, said pin being mounted to yield vertically in a suitable guide socket 236 secured to a plate 237 on the frame of the machine. At its rear end, the rack bar 219 is provided with an up-standing operating arm 238 carrying an operating handle 239 by means of which the said rack bar may be manually re-set with reference to the ratchet 217 and the gear 222. The rack bar 219 also carries a stop pin 240, adjustably mounted in one of a series of holes 241 and adapted and arranged to cooperate with a stop pin 242 secured to the plate 237 as shown. By this arrangement, as the carriage 124 approaches the end of its rearward movement, the arm 233 engages the pin 232 on the end of the pawl arm 230 as indicated in Fig. 43, thereby rocking the said pawl arm slightly rearwardly. This slight rearward movement of the pawl arm 230 causes a corresponding slight movement of the ratchet 228 and the gear 222, thereby shifting the rack bar 219 slightly forwardly so as to increase slightly the feed of the paper by the feed roller 207 on its next operation. On the outward or forward stroke of the carriage 124, the ratchet 217 operatively engages the teeth 220 on the under side of the rack bar 219, as indicated in Fig. 44, thereby rotating the feed roller 207 through a predetermined angle or movement to feed a predetermined length of the paper strip, as will be readily understood. Upon the next inward or rearward movement of the carriage 124, the rack bar 219 will be again stepped slightly forwardly so that a longer length of the rack bar 220 is thereby rendered cooperative with ratchet 217 to effect slightly greater feed of the paper strip, as explained above, and to compensate for the ever increasing diameter of the coils being concurrently wound upon the core sections 66. At the completion of the winding operation, the operator of the machine, by grasping the handle 239, may readily re-set the rack bar 219 in original position with the stop pin 240 resting against the stop pin 242, which is the proper position of initial operation of said rack bar. Thus, it will be noted, at each complete reciprocation of the carriage 124 a suitable length of paper will be fed rearwardly by the feed roller 207, and this length of paper so fed will gradually increase at each of such reciprocations so as to compensate for the ever increasing diameter of the coils being wound. Obviously, by adjusting the stop pin 240 in the holes 241, the initial position of the rack bar 219 may be nicely adjusted to cause feeding of the proper initial length of paper for insertion between the first layers of the coils being wound, and such lengths will be automatically increased by subsequent automatic operations of the machine to compensate for the increased diameter caused by each layer of wire in the coils being wound. The portion of the paper strip 163 thus fed by the feed roller 207 at each operation of the carriage 124, passes from said feed roller onto a table top formed of two transverse plates or bars 243 and 244 which constitute the top of the carriage 124, as best shown in Figs. 26 and 30 to 35, inclusive. The plates 243 and 244 are set on opposite sides of a space or slot 245 provided for the accommodation of a slitting or severing knife to be presently described. Arranged immediately above said table top and on opposite sides of the slot 245 are two clamping bars or strips 246 of sponge rubber or the like secured to the side of a clamping bar 247 carried by the rocker arms 248 secured to the under side of a rocker bar 249 mounted in suitable standards at opposite sides of the carriage 124, as best shown in Fig. 26. The clamping bar 247 is normally held in clamping engagement with the table top by means of its own weight augmented by the action of springs 250 engaging pins 251 on opposite ends of said clamping bar. The springs 250 carry stop pins 252 arranged to contact with the top of the table to limit the downward movement of said clamping bar. The rocker arms 248 carry at their extreme ends contact blocks or fingers 253 mounted at the lower end of pins or rods 254 slidable, as indicated, in the ends of said rocker arms and thereby exerting slight frictional contact with the paper strip 163. The rocker bar 249 is operated by means of a rocker arm 255 cooperating with a push rod 256 slidably mounted in the plate 244 and having a transverse stop pin 257 at its upper end, which limits its downward movement. At its lower end the push rod 256 carries a cam roller 258 cooperating with a cam plate 259 adjustably secured by means of a screw and slot arrangement 260 with the inner side of one of the side rails 126 of the frame of the machine, as best shown in Fig. 31. The cam plate 259 is provided at its forward end with one inclined cam surface 261 and adjacent its rear end with another inclined cam surface 262, said cam surfaces being set in the path of the cam roller 258 at the lower end of the push rod 256. The rocker arm 255 is provided with a detent shoulder 263 cooperating with the upper end of a spring-held detent pin 264 mounted as shown on the plate 243, said detent being adapted and arranged to engage said shoulder when the rocker arm 255 is elevated into the dotted line position indicated in Fig. 31 and thereby hold said rocker arm 255 and said clamping strips 246 in elevated or non-clamping positions. The detent pin 264 carries a transverse operating pin 265 cooperating with a rocker arm 266 connected with a push link 267 having a beveled lower end 268 cooperating with the beveled end of an adjustable spring-held cam block 269 adjustably mounted as shown in Fig. 31 on the side rail 126 immediately in front of the cam plate 259. The position of the cam block 269 is rendered adjustable by means of a set screw 270. The arrangement is such that when the carriage starts upon its initial inward or rearward movement, the cam roller 258 runs up upon the cam surface 261, thereby raising the rocker arm 255 and the clamping strips 246 to relieve the clamping pressure from the end of the paper strip 163. As the carriage continues its rearward movement and the parts assume the positions shown in Fig. 43, with the end of the paper strip 163 being fed into cooperative relationship with the wires 80 being coiled on the core sections 66, the roller 258 runs upon the second cam surface 262, thereby further elevating the rocker arms 248 and lifting the contact blocks or fingers 253 also from the paper strip, thereby completely freeing said paper strip for removal by the clamping action of the wires 80 as they are wound into the corresponding layer of the coils. Upon the forward or outward movement of the carriage 124 as explained above, and after the paper has been fed by the roller 207, also as explained above, the cam surface 268 at the lower end of the push bar 267 encounters the cam block 269 being elevated thereby to release the detent 264, thereby releasing the rocker arm 265 and permitting the clamping strips 246 to again descend into clamping engagement with said strip to hold said strip for severance by the cutting knife to be presently described. It will, therefore, be noted that at each reciprocation of the carriage 124 a sheet of paper of suitable length will be automatically fed from the strip 163 and delivered to the coils being wound.

A supplemental supporting table or apron 271, best shown in Figs. 26, 32, 34 and 45, is wound upon a spring roller 272 carried by the carriage 124 and extends rearwardly to a position adjacent the mandrel 57. The apron 271 is made of smooth flexible fabric material adapted and arranged to wind upon the roller 272 as the carriage moves rearwardly and unwind therefrom as the carriage moves forwardly, thereby providing a supporting guide for the end of the paper strip in case the same sags downwardly under its own weight. The extreme end of the apron 271 at each end loosely fitting between upstanding posts or stops 275 on the inner sides of the side rails 126, and whereby the rear end of the apron 271 may be readily raised to give ready access to the underlying or adjacent parts.

Immediately after the end of the paper strip 163 has been fed out over the table top 243—244 and clamped thereupon as explained above, the said end of said paper strip is severed by means of a rotating circular slitting knife or blade 276, best shown in Figs. 30, 32, 33, 34, 38, 39 and 40.

The slitting knife 276 is provided at opposite sides with trunnions 277 rotatably mounted in up-standing standards 278 on a bearing plate 279 having guide openings 280 at its end sliding freely over up-standing guide pins 281 on the bottom of a reciprocating carriage 282. The supporting plate 279 is further guided by means of a central depending bearing sleeve 283 operating freely through a central opening 284 in the bottom of the carriage 282. The carriage 282 is mounted to reciprocate on rollers 285 running in guide grooves 286 in hangers 287 depending from the table top 243—244 on opposite sides of the knife slot 245. The slitting knife 276 is provided with enlarged bearing or friction hubs 288 adapted and arranged to run against the under side of the table top 243—244, as best indicated in Fig. 34. Compression springs 281' are provided on the guide pins 281 and which serve to hold the slitting knife hubs 288 in operative contact with the under side of said table top. A follower plate or dog 289 is provided with a central stem or trunnion 290 fitting loosely in the bearing sleeve 283 on the under side of the supporting plate 279. The follower 289 is recessed at its under side, as shown, to fit into a groove 291 in an operating shaft 292 mounted in the carriage 124, as best shown in Fig. 30. The operating shaft 292 is provided with an adjacent enlarged portion 293 having opposite screw threads 294 therein adapted and arranged to receive the follower 289 and thereby reciprocate the carriage 282 and the slitting knife 276.

As best shown in Figs. 6, 14, 24, 27 and 30, one end of the operating shaft 292 is extended through the corresponding side of the carriage 124 and provided with a spiral gear 295 meshing with a spiral gear 296 on a counter shaft 297 mounted at its forward end in a bearing bracket 298 on the corresponding side of the carriage 124. The counter shaft 297 is provided with a longitudinal groove or key-way 297', and its rear end slides freely through a spiral gear 299 having sliding engagement with said key-way and mounted on the frame of the machine. The gear 299 meshes with a corresponding spiral gear 300 on the end of the shaft 112, which thus serves as a driving shaft for the shaft 292. By this arrangement it will be noted that the operating shaft 292 will be constantly driven by the shaft 112 and that the key-way 297' in the shaft 297 effects a splined connection with the gear 299, permitting of the necessary reciprocation of the carriage 124. A friction brake 299' secured to the inner wall of casing 91, as best shown in Fig. 14, exerts friction on the parts to prevent spinning or over-running thereof during operation.

The operation of the slitting knife 276 is controlled by a rocker arm 301 contacting with one side of the follower 289, as best shown in Figs. 27, 34, 35, 36 and 38. The rocker arm 301 is carried by a sleeve 302 adjustable on another sleeve 303 by means of a set screw 304 which is connected with a tension spring 305, as shown. The sleeve 303 is mounted on a stud shaft 306 projecting downwardly, as shown, from the under side of the plate 243, whereby the position of the rocker arm 301 may be nicely adjusted with reference to the other parts. At its upper end, the sleeve 303 carries an arm 307 engaging a detent 308 on the upper end of a plunger 309 held in elevated position by means of a spring 310. The plunger 309 carries a laterally extending pin 311 arranged under a rocker arm 312 on a rocker shaft 313 extending through a supporting block 314 on the bottom of the plate 243.

The rocker arm 312 is also provided with an operating handle 315 by means of which the detent 308 may be manually operated when desired. The rocker shaft 313 also carries at its other end the arm or lever 266 connected with the push link 277 operable by the cam block 269, as explained above.

As best shown in Fig. 27, a yieldable reversing pin 316 is mounted in the carriage 124 adjacent the opposite end of the shaft 292 adapted and arranged to engage the corresponding side of the follower 289. A suitable friction device 317 is also applied to the shaft 292 to prevent spinning or over-running of the parts. By this arrangement, when the paper clamping strips 246 are applied to the protruding end of the paper strip 163 on opposite sides of the slot 245 as explained above, the detent 308 is also simultaneously depressed to release the arm 307 and thereby release the sleeve 303. This causes rocking movement of the arm 301, thereby throwing the contacting end of the follower 289 to the right in the position of the parts shown in Fig. 27, so that said follower will be caused to engage the corresponding thread 294 on the shaft 292. The operation of said thread will cause the follower 289 and therefore the slitting knife 276 to travel transversely across the table top 243—244, thereby slitting or severing the protruding clamped end of the paper strip. As the follower 289 approaches the other end of the shaft 292, it engages the reversing pin 316, thereby depressing the same until said follower runs out of the end of said thread 294, whereupon the compressed pin 316 instantly operates to swing the follower 289 into its other position and cause it to engage with the reverse threads 294 on shaft 292, thus carrying the slitting knife back to initial position. When this initial position is approached, the rocker arm 301 is engaged by the follower 289 and the parts thereby reset for re-operation, as will be readily understood.

It will thus be noted that after the operation of the paper feeding mechanism described above to feed out a suitable length of the paper strip 163, said length of strip will be automatically severed from the remainder of the strip and held securely clamped to the table top 243-244, awaiting the next succeeding operation of the carriage 124 to apply said strip to the coils being wound upon the mandrel 57, as explained above.

The reciprocations of the carriage 124, outlined above, and serving to supply the paper sheets of insulating material to the coils being wound, are controlled by mechanism as follows: As best shown in Figs. 2, 6, 14, 15, 16, 19 to 23 inclusive, and 41, a spring contact member 317 is secured to the rear of the lever 101, said contact member 317 being provided at its upper end into a forwardly extending leaf 318 and a rearwardly extending leaf 319, carrying respectively the electric contact points 320 and 321. The contact member 317 is carried by a block 322 adjustably secured to the lever 101 by means of a clamping screw 323 engaging through a slot 324 in said lever. The contact point 320 cooperates with a contact point 325 on the spring clip 324 mounted on a block 326 adjustable on an arcuate bar 327 secured to the rear wall of the casing 91, as shown. Similarly, the contact point 321 cooperates with a contact point 329 on a block 328 adjustable also on the bar 327.

As best shown in Fig. 41, the contact member 317 is connected by a wire 330 with the electromagnet 154 which in turn is connected by a wire 331 with one of the main leads 332 for the operating motor 55. The bar 327 is connected by a wire 333 with one spring contact member 334 of the main controlling switch of the machine. The spring contact member 334 cooperates with a similar contact member 335 connected by a wire 336 with a manual switch 337 in turn connected by a wire 338 with the other connecting wire 339 for the electric motor 55. By this arrangement, as the contact member 317 oscillates with the lever 101, at each end of the oscillation of said lever, one of the contact points 325 or 329 is encountered, thereby closing the circuit leading to the main controlling switch 334—335, as will be readily understood.

The main controlling switch is operated by means of a rotatable cam disk 340 having one flat surface 341 and another flat surface 342 adapted and arranged to bear against a bearing block 343 on the spring contact member 334, as best shown in Figs. 20, 22 and 41. The disk 340 carries a crank pin 344 and also a bent operating lever 345. The crank pin 344 is connected with an operating rod 346 slidable through the adjacent wall of the casing 91 and also through a block 347 on the rear wall of said casing.

As best shown in Figs. 19, 20 and 23, the operating rod 346 carries a depending arm or bar 348 adjustably secured thereto by means of a set screw 349. The bar 348 carries two contact pins 350 and 351 set on opposite sides of the pivot of a lever 352 pivoted at 353 on the rear wall of the casing 91.

At its lower end, the lever 352 is provided with a beveled nose or point 354 cooperating with a screw pin 355 threaded in a block 356 and passing through the slot 324 of the lever 101, and whereby said screw 355 is rendered adjustable in said slot. By this arrangement, as the lever 101 oscillates in either direction, the screw 355 engages the nose 354 of the lever 352, thereby oscillating said lever as indicated by the dotted lines in Fig. 23. Upon oscillation of said lever in either direction, the corresponding pin 350 or 351 will be engaged and operated by the lever 352, thereby moving the operating rod 346 to oscillate the disk 340 from the position indicated in Fig. 20 into the position indicated in Fig. 22. In the position indicated in Fig. 20, the main controlling switch 334—335 is open, and in the position indicated in Fig. 22 the same is closed, so that, as the lever 101 passes its central position in each direction, the disk 340 will be manipulated to close the main controlling switch 334—335. Obviously, if the main controlling switch is closed at the same time that contact is effected between the contact member 317 and either of the contact points 325 or 329, the circuit through the electro-magnet 154 will be closed at each instance, thereby engaging the clutch 140—141 and starting the carriage 124 on its reciprocation to feed the paper sheet to the coils being wound. The parts are adjusted so that this feed of the carriage occurs as the lug 115 passes around each end of the controlling plate 116, and therefore during the pause in the coil winding operation which occurs as the block 103 is shifted from one of its operating shafts 112 and 113 to the other.

The arrangement is such that during this pause in the coil winding operation, the rear edge of the paper sheet which has been severed from the paper strip, is inserted in the angle between the wires 80 and the mandrel 57 just after the completion of each layer of the coils and before starting the winding of the next layer, as best indicated in Fig. 43. Obviously, the inserted edge of the paper sheet will be at once engaged and bound to the mandrel by the wires being coiled thereon so that said sheet will be thereby automatically wrapped around and bound in position on the mandrel and interposed between the layers of the coils to insulate the same from each other. Thus, as the winding of the coils proceeds, a sheet of paper of proper length will be automatically inserted between each layer of the coils, as will be readily understood.

As best shown in Fig. 43, the arm 233 on the connecting rod 131 is arranged to engage the projecting end of the operating arm 345 of the main control switch when said switch is in the closed position shown in Fig. 22 adjacent the inner end of the movement of the carriage 124. This contact by the arm 233 with the arm 345 serves to open the main controlling switch at each inward movement of the carriage 124, thereby resetting the same for closing through the operation of the lever 352, as explained above, and so that the starting of the operation of the carriage will be properly timed to feed the paper at the proper time, as explained above.

A manual switch 357, best shown in Figs. 1, 2 and 41, is provided for quickly stopping the machine by the operator when desired. The switch 357 is connected by one wire 358 with the main motor lead 332. Another wire 359 connects said switch 357 with an electro-magnet 360 also connected by a wire 361 with the motor lead wire 339. The electro-magnet 360 cooperates with a spring-held armature-detent 362 engaging lever 363 of starting box 364 of the machine. The starting box 364 is connected, as indicated, with the motor lead wire 339, and the lever 363 is connected with a wire 365 which constitutes the other main lead of the motor. The lever 363 is normally pressed toward circuit breaking position by means of a compression spring 363' and is equipped with a manually operable push rod 366 by means of which the motor circuit may be readily closed when desired. By this arrangement, it will be noted that, when desired, the operator may close the switch 357 which will close the circuit through the electro-magnet 360, thereby withdrawing the detent 362 from the lever 363, releasing the same so that the spring 363' will automatically break the motor circuit and thereby stop the machine.

The stopping of the machine is facilitated by a brake lever 367 engaging a fly wheel 368 on the motor shaft 54. The brake lever 367 is pivoted at 369 and normally pressed toward breaking position by means of a tension spring 370. The brake lever 367 is normally withheld from breaking action by means of a spring-held armature-detent 371 engaging a stop 372 on said lever.

A trip lever 362' is also arranged to cooperate with detent 362, as best shown in Fig. 13, so that said detent may be tripped by hand and the machine thus stopped when desired.

The armature-detent 371 cooperates with an electro-magnet 373 connected by one wire 374 with the motor lead 339 and by another wire 375 with wire 359 leading to the switch 357 so that, whenever the switch 357 is closed, a circuit through electro-magnet 373 is also closed, thereby withdrawing the detent 371 and automatically applying the brake 367 to stop the motor shaft 54 quickly and thus prevent overrunning or spinning of the parts. An operating handle 376 is also provided on the brake lever 367 so that the same can be manually manipulated when desired.

As best shown in Fig. 2, an indicator 377 is operatively connected with counting or controlling mechanism enclosed in casing 378, said counting or controlling mechanism being operatively connected with the main operating shaft 50 of the machine. This counting or controlling mechanism is fully disclosed and described in my copending application, Serial No. 307,177, and requires no further description here beyond the statement that it serves to automatically stop the machine after a predetermined number of turns have been incorporated in the coils being wound thereon.

In actual operation, the operator first inserts in the machine a mandrel 57 carrying a set of core sections 66, the binding nut 64 being adjusted to leave a slight space between said core sections. Then the operator winds the end of each of the wires 80 about a strip of fiber or the like and inserts said strip in the space between the core sections or between the end core section and the washer 62, the looseness of the binding nut 64 permitting of the separation and movement of the core sections 66 sufficiently to permit of this. Then the binding nut 64 is tightened and the ends of the wires are thus securely held in place on the mandrel. A loose preliminary sheet of insulating material is then laid on the mandrel by hand and the machine manipulated by hand sufficiently to bind the inserted sheet in place.

The machine is then started by the operator by manipulating the starting lever 363, and the winding operation proceeds as outlined above. When the predetermined number of turns have been incorporated in the coils, the machine automatically stops through the action of the counting or controlling mechanism enclosed in the casing 378. Then the operator manually inserts another sheet of insulating material, preferably distinctively colored, and proceeds as before to wind the secondary winding of the coil about and over the primary winding thereof, as will be readily understood.

When the machine again automatically stops, a coating of melted paraffin or the like is applied by the operator to the outer surfaces of the wound coils, which holds the wires in place thereon. Then the ends of the wires are broken by the operator and the completed coils removed from the machine by removing the mandrel 57 therefrom, as explained above.

Thus, at each operation of the machine, a plurality of coils will be wound with great accuracy and economy. The different layers of the coils so wound will be insulated from each other by the inserted sheets of paper or the like. The coils thus provided are subsequently further treated to improve and render permanent the insulation thereof and then are severed from each other. The ends of the primary and secondary windings may be readily found in the severed coils and suitable terminals applied thereto and the coils incorporated in various forms of electrical apparatus, as will be readily understood by those skilled in this art.

While we have illustrated and described the preferred form of construction for carrying our invention into effect, this is capable of variation and modification without departing from the spirit of the invention. We therefore do not wish to be confined to the precise details disclosed but desire to avail ourselves of such variations and modifications as come within the scope of the appended claims.

We claim:

1. A machine of the class described, comprising a rotatable mandrel and means for winding a plurality of coils of wire thereon in layers; a reciprocating carriage arranged to reciprocate toward and away from said mandrel; a roll of flexible insulating material; and means on said carriage for withdrawing sections of material from said roll and severing and inserting said sections between the layers of said coils, each of said means operating in timed relation to each other and to the reciprocation of said carriage.

2. A machine of the class described, comprising a rotatable mandrel and means for winding a plurality of coils of wire thereon in layers; a reciprocating carriage arranged to reciprocate toward and away from said mandrel; a roll of flexible insulating material; and means on said carriage for withdrawing sections of material of progressively increasing length from said roll and severing and inserting said sections between the layers of said coils each of said means operating in timed relation to each other and to the reciprocation of said carriage.

3. A machine of the class described, comprising a rotatable mandrel; wire guiding means arranged to guide wires onto said mandrel; means for reciprocating said guide means to and fro along said mandrel; a reciprocating carriage arranged to reciprocate toward and away from said mandrel; a roll of flexible insulating material associated therewith; means on said carriage for withdrawing sections of progressively increasing length from said roll, severing said sections and inserting the same between the layers of said coils; and means, controlled by said guide reciprocating means, for operating said carriage each of said means operating in timed relation to each other and to the reciprocation of said carriage.

4. A machine of the class described, comprising a rotatable mandrel and means for winding a plurality of coils of wire thereon in layers; a reciprocating carriage arranged to reciprocate toward and away from said mandrel; a roll of flexible insulating material associated therewith; means for withdrawing sections of said material from said roll and causing said sections to hang in a loop; a rack bar carried by said carriage and having a pawl and ratchet connection to operate said withdrawing means; means for shifting said rack bar on said carriage at each reciprocation thereof to increase the withdrawing effect thereof; and means on said carriage for withdrawing said sections from said loop, severing said sections and inserting the same between the layers of said coils.

5. A machine of the class described, comprising a rotatable mandrel and means for winding a plurality of coils of wire thereon in layers; a reciprocating carriage arranged to reciprocate toward and away from said mandrel; a roll of paper insulating material associated therewith; means for withdrawing sections of said material from said roll and causing said sections to hang in a loop; a rack bar carried by said carriage and having a pawl and ratchet connection to operate said withdrawing means; paper feeding mechanism on said carriage arranged to withdraw said sections from said loop; a second rack bar on said carriage having a pawl and ratchet connection with said paper feeding mechanism arranged to operate the same to withdraw said sections from said loop; and means on said carriage for severing and inserting said sections between the layers of said coils.

6. A machine of the class described, comprising a rotatable mandrel and means for winding a plurality of coils of wire thereon in layers; a reciprocating carriage arranged to reciprocate toward and away from said mandrel; a roll of paper insulating material associated therewith; means for withdrawing sections of said material from said roll and causing said sections to hang in a loop; a rack bar carried by said carriage and having a pawl and ratchet connection to operate said withdrawing means; means for shifting said rack bar on said carriage at each reciprocation thereof to increase the withdrawing effect thereof; feeding mechanism on said carriage arranged to withdraw said sections from said loop; a second rack bar on said carriage having a pawl and ratchet connection with said feeding mechanism arranged to operate the same to withdraw said sections from said loop; and means on said carriage for severing and inserting said sections between the layers of said coils.

7. A machine of the class described, comprising a rotatable mandrel and means for winding a plurality of coils of wire thereon in layers; a reciprocating carriage arranged to reciprocate toward and away from said mandrel; a roll of paper insulating material associated therewith; means for withdrawing sections of said material from said roll and causing said sections to hang in a loop; a rack bar carried by said carriage and having a pawl and ratchet connection with said withdrawing means; paper feeding mechanism on said carriage arranged to withdraw said sections from said loop; a second rack bar on said carriage having a pawl and ratchet connection with said paper feeding mechanism arranged to operate the same to withdraw said sections from said loop; a transversely reciprocating knife mounted on said carriage and arranged to sever said sections; clamping means on said carriage arranged to clamp the severed sections thereon; and means for guiding said severed sections into the angle between said wires and said mandrel.

8. A machine of the class described, comprising a rotatable mandrel and means for winding a plurality of coils of wire thereon in layers; a reciprocating carriage arranged to reciprocate toward and away from said mandrel; a roll of paper insulating material associated therewith; means for withdrawing sections of said material from said roll and causing said sections to hang in a loop; a rack bar carried by said carriage and having a pawl and ratchet connection with said withdrawing means; paper feeding mechanism on said carriage arranged to withdraw said sections from said loop; a second rack bar on said carriage having a pawl and ratchet connection with said paper feeding mechanism arranged to operate the same to withdraw said sections from said loop; a transversely reciprocating knife mounted on said carriage and arranged to sever said sections; clamping means on said carriage arranged to clamp the severed sections thereon; a spring roller mounted on said carriage; and a flexible apron wound on said roller at one end and having its other end secured adjacent said mandrel and adapted and arranged to guide said severed sections into the angle between said wires and said mandrel.

9. Means for varying the feed of insulating material, comprising feeding mechanism; a reciprocatory carriage; a rack bar carried by said carriage; a frictionally held pinion on said carriage meshing with said rack bar; a ratchet connection with said pinion; an oscillatory pawl arm cooperating with said ratchet; a stop engaging said pawl arm at each reciprocation of said carriage to shift said rack bar longitudinally on said carriage; and a pawl and ratchet connection between said rack bar and said feeding mechanism.

10. The combination of a frame; a rotatable mandrel and means for winding wire thereon; a reciprocating carriage arranged to reciprocate toward and away from said mandrel; a spring roller on said carriage; and an apron having one end wound on said roller and the other end attached to said frame adjacent said mandrel.

11. A machine of the class described, comprising a frame; a rotatable mandrel in said frame; means for guiding a plurality of wires thereto; an oscillatory lever connected to reciprocate said wire guiding means; a roll of flexible material; a feed roller arranged to contact with the periphery of said roll; means for operating said feed roller; means for pressing said roll against said roller; a reciprocating carriage arranged to reciprocate toward and away from said mandrel; a table top on said carriage having a transverse slot; a knife blade mounted to reciprocate along said slot and protruding therethrough; feed rollers on said carriage arranged to feed said material from said roll over said table top; means for intermittently operating said last mentioned feed rollers to feed a predetermined length of material over said slot; means for temporarily clamping said material to said table top on opposite sides of said slot; means for reciprocating said knife; a spring roller on said carriage; a flexible apron wound on said roller and arranged to direct the free edge of said material into the angle between said wires and said mandrel; means for releasing said clamping means; means for reciprocating said carriage; an electric circuit and means therein for controlling said carriage reciprocating means; and means operable by said oscillatory lever for controlling said circuit.

CHESTER H. THORDARSON.
OSCAR A. PEARSON.